(12) United States Patent
Bienkowski et al.

(10) Patent No.: US 9,645,915 B2
(45) Date of Patent: May 9, 2017

(54) CONTINUOUS EVALUATION OF PROGRAM CODE AND SAVING STATE INFORMATION ASSOCIATED WITH PROGRAM CODE

(71) Applicant: The MathWorks, Inc., Natick, MA (US)

(72) Inventors: Joseph R. Bienkowski, East Longmeadow, MA (US); John E. Booker, Jamaica Plain, MA (US)

(73) Assignee: The Mathworks, Inc., Natick, MA (US)

( * ) Notice: Subject to any disclaimer, the term of this patent is extended or adjusted under 35 U.S.C. 154(b) by 0 days.

(21) Appl. No.: 13/631,081

(22) Filed: Sep. 28, 2012

(65) Prior Publication Data

US 2013/0024837 A1   Jan. 24, 2013

(51) Int. Cl.
*G06F 11/36*   (2006.01)

(52) U.S. Cl.
CPC ...... *G06F 11/3688* (2013.01); *G06F 11/3664* (2013.01)

(58) Field of Classification Search
CPC .......................... G06F 11/3688; G06F 11/3664
See application file for complete search history.

(56) References Cited

U.S. PATENT DOCUMENTS

| | | |
|---|---|---|
| 4,931,928 A | 6/1990 | Greenfeld |
| 5,317,740 A | 5/1994 | Sites |
| 5,327,568 A | 7/1994 | Maejima et al. |
| 5,339,428 A | 8/1994 | Burmeister et al. |
| 5,604,895 A | 2/1997 | Raimi |
| 5,649,222 A | 7/1997 | Mogilevsky |
| 5,673,390 A | 9/1997 | Mueller |
| 5,675,803 A | 10/1997 | Preisler et al. |
| 5,754,860 A | 5/1998 | McKeeman et al. |
| 5,758,061 A | 5/1998 | Plum |
| 5,781,776 A | 7/1998 | Johnston et al. |
| 5,854,924 A | 12/1998 | Rickel et al. |
| 5,872,976 A | 2/1999 | Yee et al. |
| 5,933,640 A | 8/1999 | Dion |
| 5,966,532 A | 10/1999 | McDonald et al. |
| 6,115,544 A | 9/2000 | Mueller |
| 6,131,185 A | 10/2000 | Coskun et al. |

(Continued)

FOREIGN PATENT DOCUMENTS

WO   WO 2008/082610   7/2008

OTHER PUBLICATIONS

Bret Victor, "Inventing on Principle—on Vimeo", www.vimeo.com/36579366, Sep. 12, 2012 (print date), 3 pages.

(Continued)

*Primary Examiner* — Li B Zhen
*Assistant Examiner* — Amir Soltanzadeh
(74) *Attorney, Agent, or Firm* — Harrity & Harrity, LLP

(57) ABSTRACT

A device receives a program code being created or edited, executes a first portion of the program code to generate a first result, and executes a second portion of the program code to generate a second result. The device stores the first result and the second result, and compares the first result and the second result to determine a difference between the first result and the second result. The device utilizes the difference to identify an error in the program code, and provides information, associated with the difference and the error, for display.

20 Claims, 19 Drawing Sheets

(56) References Cited

U.S. PATENT DOCUMENTS

| | | |
|---|---|---|
| 6,195,765 B1 | 2/2001 | Kislanko et al. |
| 6,202,199 B1 | 3/2001 | Wygodny et al. |
| 6,202,200 B1 | 3/2001 | House et al. |
| 6,237,138 B1 | 5/2001 | Hameluck |
| 6,249,882 B1 | 6/2001 | Testardi |
| 6,263,489 B1 | 7/2001 | Olsen et al. |
| 6,282,701 B1 | 8/2001 | Wygodny et al. |
| 6,305,008 B1 | 10/2001 | Vaidyanathan et al. |
| 6,353,923 B1 | 3/2002 | Bogle et al. |
| 6,367,068 B1 * | 4/2002 | Vaidyanathan et al. ...... 717/143 |
| 6,385,769 B1 | 5/2002 | Lewallen |
| 6,408,430 B2 | 6/2002 | Gunter et al. |
| 6,434,738 B1 | 8/2002 | Arnow |
| 6,490,696 B1 | 12/2002 | Wood et al. |
| 6,493,868 B1 | 12/2002 | DaSilva et al. |
| 6,542,900 B1 | 4/2003 | Xia |
| 6,691,303 B2 * | 2/2004 | Guthrie et al. ............... 717/124 |
| 6,694,509 B1 | 2/2004 | Stoval et al. |
| 6,792,595 B1 | 9/2004 | Storistenau et al. |
| 6,836,884 B1 | 12/2004 | Evans et al. |
| 6,915,509 B1 | 7/2005 | Chkodrov et al. |
| 6,925,635 B2 | 8/2005 | Garvey |
| 6,971,084 B2 | 11/2005 | Grey et al. |
| 6,988,264 B2 | 1/2006 | Sarma et al. |
| 7,020,852 B2 | 3/2006 | Oeltjen et al. |
| 7,055,140 B2 | 5/2006 | Bystricky et al. |
| 7,058,928 B2 | 6/2006 | Wygodny et al. |
| 7,089,534 B2 | 8/2006 | Hartman et al. |
| 7,127,704 B2 | 10/2006 | Van De Vanter et al. |
| 7,134,115 B2 | 11/2006 | Kawai et al. |
| 7,146,613 B2 | 12/2006 | Chauvel et al. |
| 7,171,655 B2 | 1/2007 | Gordon et al. |
| 7,200,838 B2 | 4/2007 | Kodosky et al. |
| 7,222,333 B1 | 5/2007 | Mor et al. |
| 7,257,804 B2 | 8/2007 | Baecker et al. |
| 7,302,675 B2 | 11/2007 | Rogers et al. |
| 7,343,588 B2 | 3/2008 | Bates et al. |
| 7,383,534 B1 | 6/2008 | Agbabian et al. |
| 7,444,619 B2 | 10/2008 | McManus |
| 7,448,026 B1 | 11/2008 | Gustafson et al. |
| 7,475,385 B2 | 1/2009 | Huemiller, Jr. |
| 7,496,906 B2 | 2/2009 | Black-Ziegelbein et al. |
| 7,506,304 B2 | 3/2009 | Morrow et al. |
| 7,516,441 B2 | 4/2009 | Hamilton et al. |
| 7,519,952 B2 | 4/2009 | Bordawekar et al. |
| 7,530,052 B2 | 5/2009 | Morrow et al. |
| 7,584,452 B1 | 9/2009 | Johnson |
| 7,636,914 B1 | 12/2009 | Johnson |
| 7,650,592 B2 | 1/2010 | Eckels et al. |
| 7,669,187 B2 | 2/2010 | Liu et al. |
| 7,669,188 B2 | 2/2010 | Nickell et al. |
| 7,673,289 B1 | 3/2010 | Johnson |
| 7,685,570 B2 | 3/2010 | Draine et al. |
| 7,694,277 B2 | 4/2010 | Yuknewicz et al. |
| 7,698,691 B2 | 4/2010 | Chen |
| 7,823,135 B2 | 10/2010 | Horning et al. |
| 7,917,894 B2 | 3/2011 | Chen et al. |
| 7,949,995 B2 | 5/2011 | Sadlek |
| 7,984,428 B1 | 7/2011 | Seymour |
| 8,037,452 B2 | 10/2011 | Minium et al. |
| 8,079,019 B2 | 12/2011 | Lindo et al. |
| 8,087,002 B2 | 12/2011 | Fjeldstad et al. |
| 8,104,021 B2 | 1/2012 | Erlingsson et al. |
| 8,136,102 B2 | 3/2012 | Papakipos |
| 8,146,058 B2 | 3/2012 | Sarkar et al. |
| 8,151,244 B2 | 4/2012 | Hsu et al. |
| 8,219,980 B2 | 7/2012 | Bates et al. |
| 8,250,524 B2 | 8/2012 | Barnett |
| 8,296,730 B2 | 10/2012 | Whitechapel et al. |
| 8,296,738 B1 | 10/2012 | Kiel et al. |
| 8,312,435 B2 | 11/2012 | Wygodny et al. |
| 8,365,149 B2 | 1/2013 | Frank et al. |
| 8,365,286 B2 | 1/2013 | Poston |
| 8,392,885 B2 | 3/2013 | Stall et al. |
| 8,443,348 B2 | 5/2013 | McGuire |
| 8,468,502 B2 | 6/2013 | Lui |
| 8,572,578 B2 | 10/2013 | Stall |
| 8,589,888 B2 | 11/2013 | Cui et al. |
| 8,593,703 B2 | 11/2013 | Kort |
| 8,595,703 B2 | 11/2013 | Van Gogh et al. |
| 8,601,442 B2 | 12/2013 | Shafi |
| 8,640,103 B2 | 1/2014 | Sheppard |
| 8,656,351 B2 | 2/2014 | Kodosky et al. |
| 8,676,966 B2 | 3/2014 | Podjarny et al. |
| 8,683,318 B1 | 3/2014 | Dasari et al. |
| 8,689,188 B2 | 4/2014 | Bassin |
| 8,719,793 B2 | 5/2014 | Maeda |
| 8,762,956 B1 | 6/2014 | Simoneau et al. |
| 8,799,871 B2 | 8/2014 | Baker |
| 8,832,663 B2 | 9/2014 | Krauss |
| 8,839,204 B2 | 9/2014 | Gounares et al. |
| 8,862,950 B1 | 10/2014 | Ginsberg |
| 8,863,085 B1 | 10/2014 | Stahlberg |
| 8,887,138 B2 | 11/2014 | Eker |
| 8,893,084 B2 | 11/2014 | Parker et al. |
| 8,904,349 B2 | 12/2014 | Hudson et al. |
| 8,935,673 B1 | 1/2015 | Ashkenazi et al. |
| 8,938,718 B2 | 1/2015 | Krauss |
| 8,978,014 B1 | 3/2015 | Larsen |
| 8,997,063 B2 | 3/2015 | Krajec et al. |
| 9,053,228 B1 | 6/2015 | Bienkowski et al. |
| 9,053,235 B1 | 6/2015 | Bienkowski et al. |
| 2002/0049838 A1 | 4/2002 | Sylor |
| 2002/0100016 A1 | 7/2002 | Van De Vanter et al. |
| 2002/0184611 A1 | 12/2002 | Endejan |
| 2003/0163801 A1 | 8/2003 | Thames et al. |
| 2003/0200533 A1 | 10/2003 | Roberts et al. |
| 2003/0221184 A1 | 11/2003 | Gunjal et al. |
| 2004/0083457 A1 * | 4/2004 | Boucher ........................ 717/129 |
| 2004/0143819 A1 | 7/2004 | Cheng et al. |
| 2005/0015751 A1 | 1/2005 | Grassens |
| 2005/0065990 A1 * | 3/2005 | Allen ............................ 708/495 |
| 2005/0102653 A1 | 5/2005 | Henderson et al. |
| 2005/0223363 A1 | 10/2005 | Black-Ziegelbein et al. |
| 2005/0235265 A1 | 10/2005 | Allen |
| 2006/0156286 A1 | 7/2006 | Morgan |
| 2006/0212843 A1 | 9/2006 | Zaky et al. |
| 2007/0169004 A1 | 7/2007 | Prakash |
| 2007/0226543 A1 | 9/2007 | Young et al. |
| 2008/0092123 A1 * | 4/2008 | Davison et al. ............. 717/128 |
| 2008/0109790 A1 | 5/2008 | Farnham et al. |
| 2008/0127067 A1 | 5/2008 | Aubertine et al. |
| 2008/0141222 A1 | 6/2008 | Alpern |
| 2008/0141226 A1 | 6/2008 | Girouard et al. |
| 2008/0178143 A1 | 7/2008 | Dougan et al. |
| 2009/0070738 A1 | 3/2009 | Johnson |
| 2009/0125888 A1 | 5/2009 | Von Der Ahe |
| 2010/0050157 A1 | 2/2010 | Daniel |
| 2010/0287525 A1 | 11/2010 | Wagner |
| 2011/0307870 A1 | 12/2011 | Stairs et al. |
| 2012/0131547 A1 | 5/2012 | Muir |
| 2013/0053996 A1 * | 2/2013 | Wu ............................... 700/100 |
| 2013/0311973 A1 | 11/2013 | Rice et al. |

OTHER PUBLICATIONS

"Computer Science | Khan Academy", www.khanacademy.org/cs, Sep. 25, 2012 (print date), 5 pages.

David Gallardo, "Getting Started with the Eclipse Platform Using Eclipse Plug-Ins to Edit, Comple and Debug your App", Nov. 1, 2002, pp. 1-16.

"Eclipse Platform Technical Overview", published by IBM, Apr. 19, 2006, pp. 1-19.

David Saff et al., "An experimental evaluation of continuous testing during development", http://people.csail.mit.edu/mernst/pubs/ct-user-study-issta2004.pdf (2004).

David Saff et al., "Continuous Testing in Eclipse", http://people.csail.mit.edu/mernst/pubs/contest-plugin-etx2004.pdf (2004).

David Saff et al., "Continuous Testing in Eclipse", *Electronic Notes in Theoretical Computer Science*, vol. 107:103-117 (2004).

International Search Report for Application No. PCT/US2007/026422, dated Sep. 29, 2008.

(56) References Cited

OTHER PUBLICATIONS

European Office Action for Application No. 07868098.0 dated Jan. 29, 2010.
Notification of transmittal of the International Search Report and the Written Opinion of the International Searching Authority, or the Declaration corresponding to PCT/US2013/062335 mailed Feb. 20, 2014, 11 pages.
Notification of transmittal of the International Search Report and the Written Opinion of the International Searching Authority, or the Declaration corresponding to PCT/US2013/062236 mailed Feb. 20, 2014, 11 pages.
Karinthi et al., "Incremental re-execution of programs," SIGPLAN '87 Papers of the Symposium on Interpreters and Interpretive techniques, 1987, pp. 38-44.
Saff et al., "Reducing wasted development time via continuous testing," 14th International Symposium on Software Reliability Engineering, 2003, pp. 281-292.
Moher, "PROVIDE: a process visualization and debugging environment," IEEE Transactions on Software Engineering, vol. 14, Issue 6, 1988, pp. 849-857.
Schwartz et al., "Incremental compilation in Magpie," ACM SIGPLAN Notices—Proceedings of the SIGPLAN '84 symposium on compiler constructions, vol. 19, Issue 6, 1984, pp. 122-131.
Steinert et al., "Continuous Selective Testing," Proceedings of the international Conference on Agile Software Development (XP), Springer LNBIP 48, 2010, pp. 132-146.
Henderson et al., "Continuous execution: the VisiProg environment," ICSE '85 Proceedings of the 8th International conference on Software engineering, 1985, pp. 68-74.
Kortenkamp et al., "A Suite of Tools for Debugging Distributed Autonomous Systems," Kluwer Academic Publishers, 2004, pp. 157-187.
Saff et al., "An Experimental Evaluation of Continuous Testing During Development," ISSTA'04, Boston, Massachusetts, USA, Copyright 2004 ACM 1-58113-820-2/04/0007, Jul. 11-14, 2004, pp. 76-85.
Xie et al., "Using Redundancies to Find Errors," IEEE Transactions on Software Engineering, vol. 29, Issue 10, 2003, pp. 915-928.
Snelting et al., "How to Build LD Parsers Which Accept Incomplete Input," ACM SIGPLAN Notices Homepage archive, vol. 25, Issue 4, 1990, pp. 51-58.
Fontana et al, "Impact of Refactoring on Quality Code Evaluation", ACM, pp. 37-40, 2011.
Ficco et al, "Bug Localization in Test-Driven Development", Hindawi Publishing Corporation, Advances in Software Engineering, vol. 2011, Article ID 492757, pp. 1-18, 2011, 18 pages.
DiGiuseppe, "Automatically Describing Software Faults", ACM, pp. 711-714, 2013.
Fontana et al, "Investigating the Impact of Code Smells Debt on Quality Code Evaluation", IEEE, pp. 15-22, 2012.
Eng, "Combining Static and Dynamic Data in Code Visualization", ACM, pp. 43-50, 2002.
Genz et al, "Overcoming Limitations of the SystemC Data Introspection", ACM, pp. 590-593, 2009.
Ding et al, "A Comiler Scheme for Reusing Intermediate Computation Results", IEEE, pp. 1-12, 2004.
Song et al, "Enhancing Source-Level Programming Tool with an Awareness of Transparent Program Transformations", ACM, 301-318, 2009.
Ohshima et al, "KScript and KSWorld: a time-aware and mostly declarative language and interactive GUI framework", ACM, pp. 117-134, 2013.
Dyer et al, "A Decision Tree-based Approach to Dynamic Pointcut Evaluation", ACM, pp. 1-10, 2008.
Reps et al, "Intermediate-Representation Recovery from Low-Level Code", ACM, pp. 100-111, 2006.
Yin et al, "A Fine-Grained Debugger for Aspect-Oriented Programming", ACM, pp. 59-70, 2012.
Zitser et al, "Testing Static Analysis Tools using Exploitable Buffer Overflows from Open Source Code", ACM, pp. 97-106, 2004.
Jiang et al, "Generalized Cofactoring for Logic Function Evaluation", ACM, pp. 155-158, 2003.
Debois, "Imperative Program Optimization by Partial Evaluation", ACM, pp. 113-122, 2004, 10 pages.
Urma et al, "Programming Language Evolution via Source Code Query Languages", ACM, pp. 35-38, 2012, 4 pages.
Berges et al, "Evaluation of Source Code with Item Response Theory", ACM, pp. 51-56, 2015, 6 pages.
Diop et al, "QoS-aware Multipath-TCP extensions for mobile and multimedia applications", ACM, pp. 141-146, 2011, 6 pages.
Lelli et al, "Automatic Detection of GUI Design Smells: The Case of Blob Listener", ACM, pp. 263-274, 2016, 12 pages.
Silva et al, "Generating User Interface Code in a Model Based User Interface Development Environment", ACM, pp. 155-160, 2000, 6 pages.
Savidis et al, "Software Refactoring Process for Adaptive User-Interface Composition", ACM, pp. 19-28, 2010, 10 pages.

\* cited by examiner

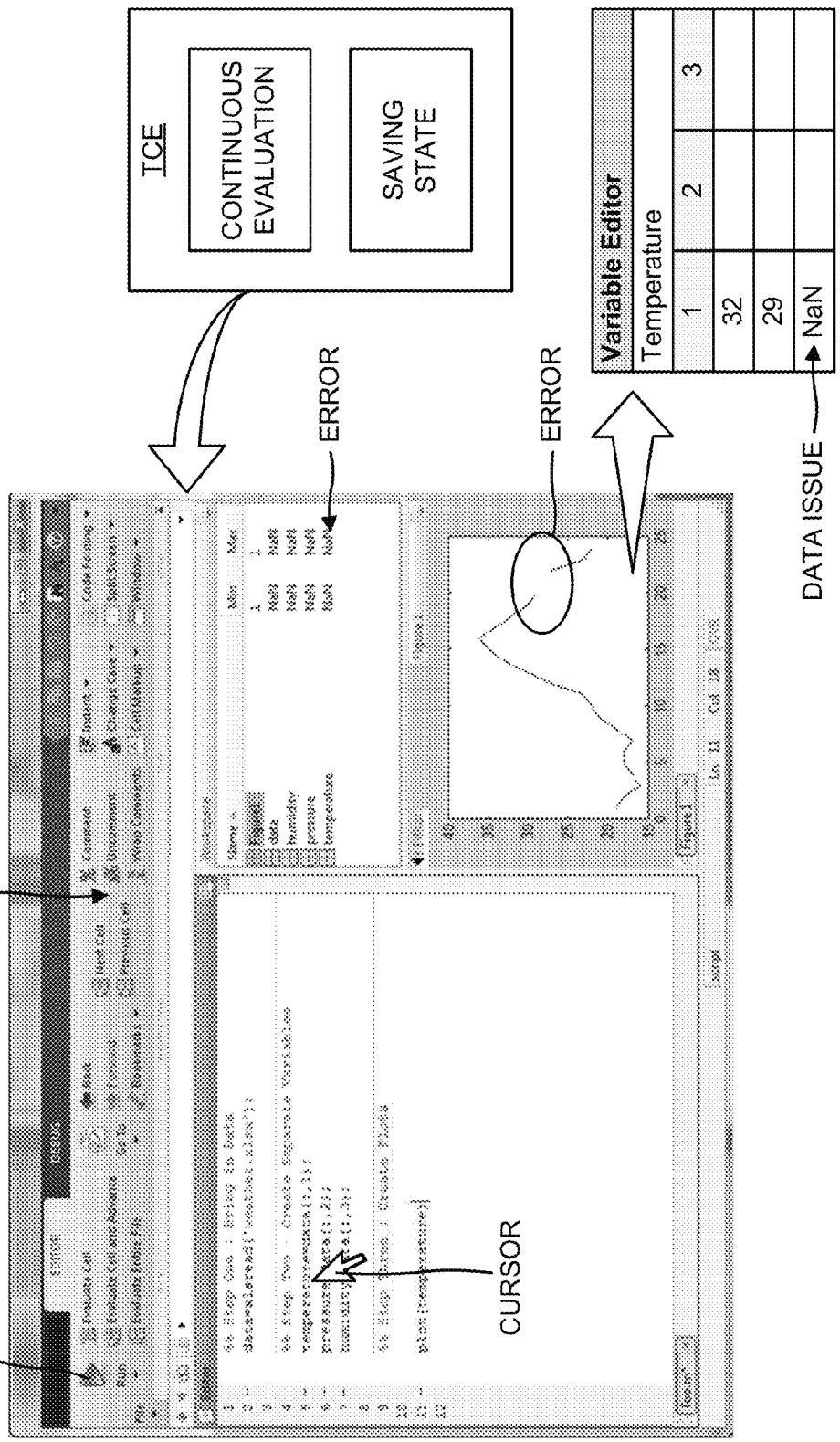

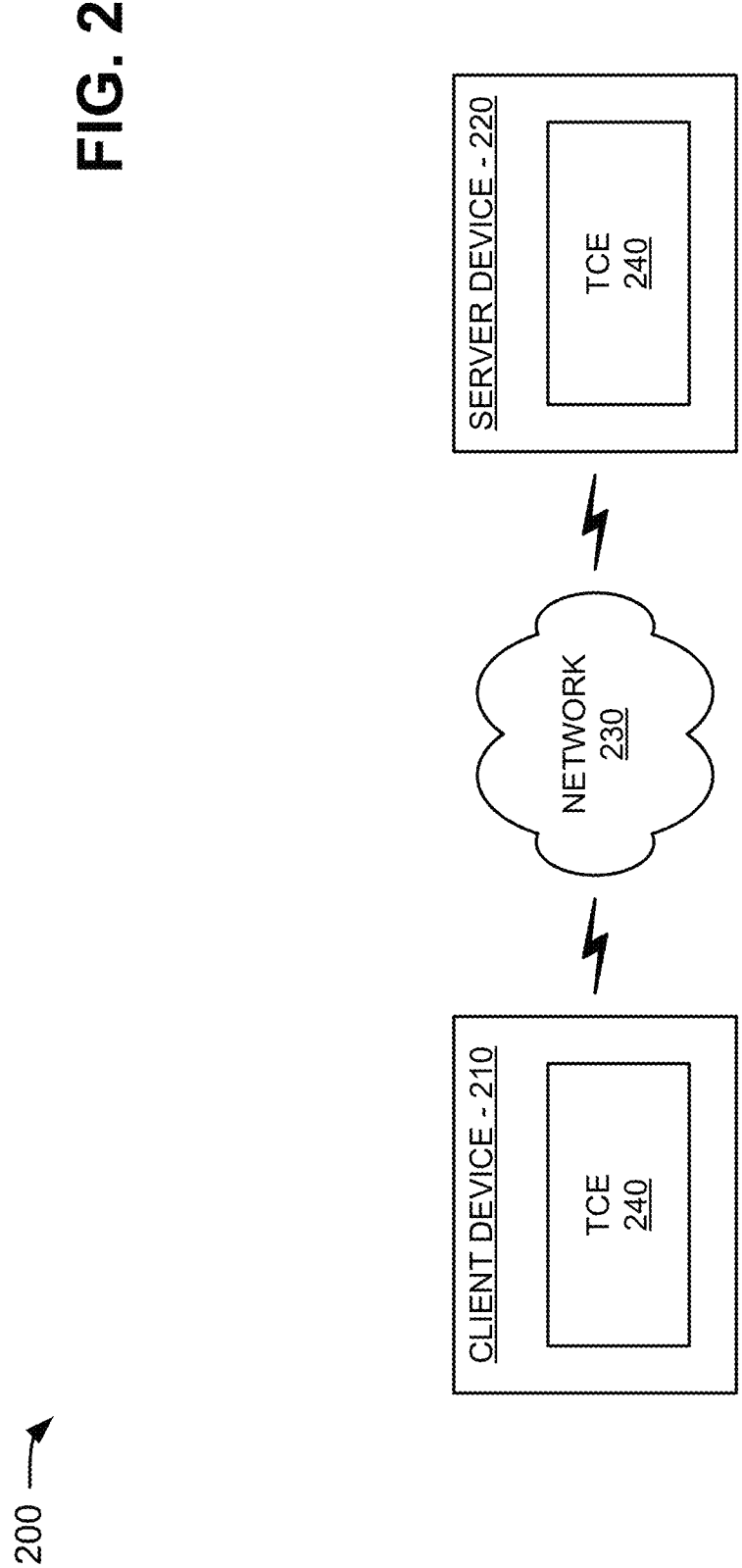

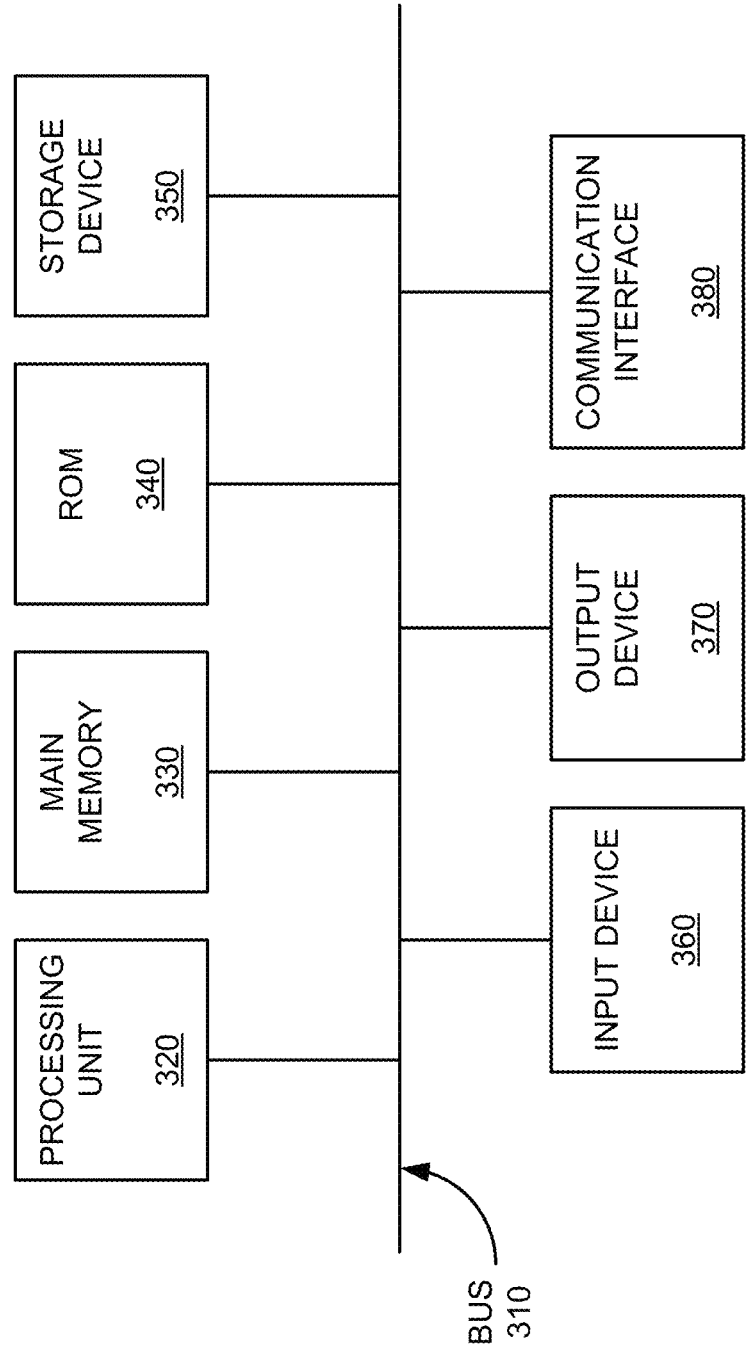

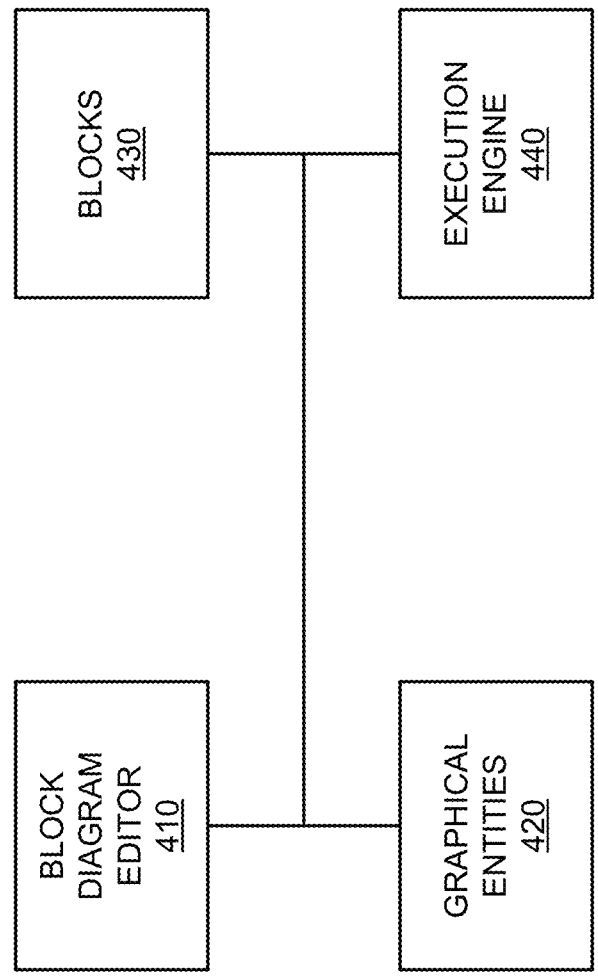

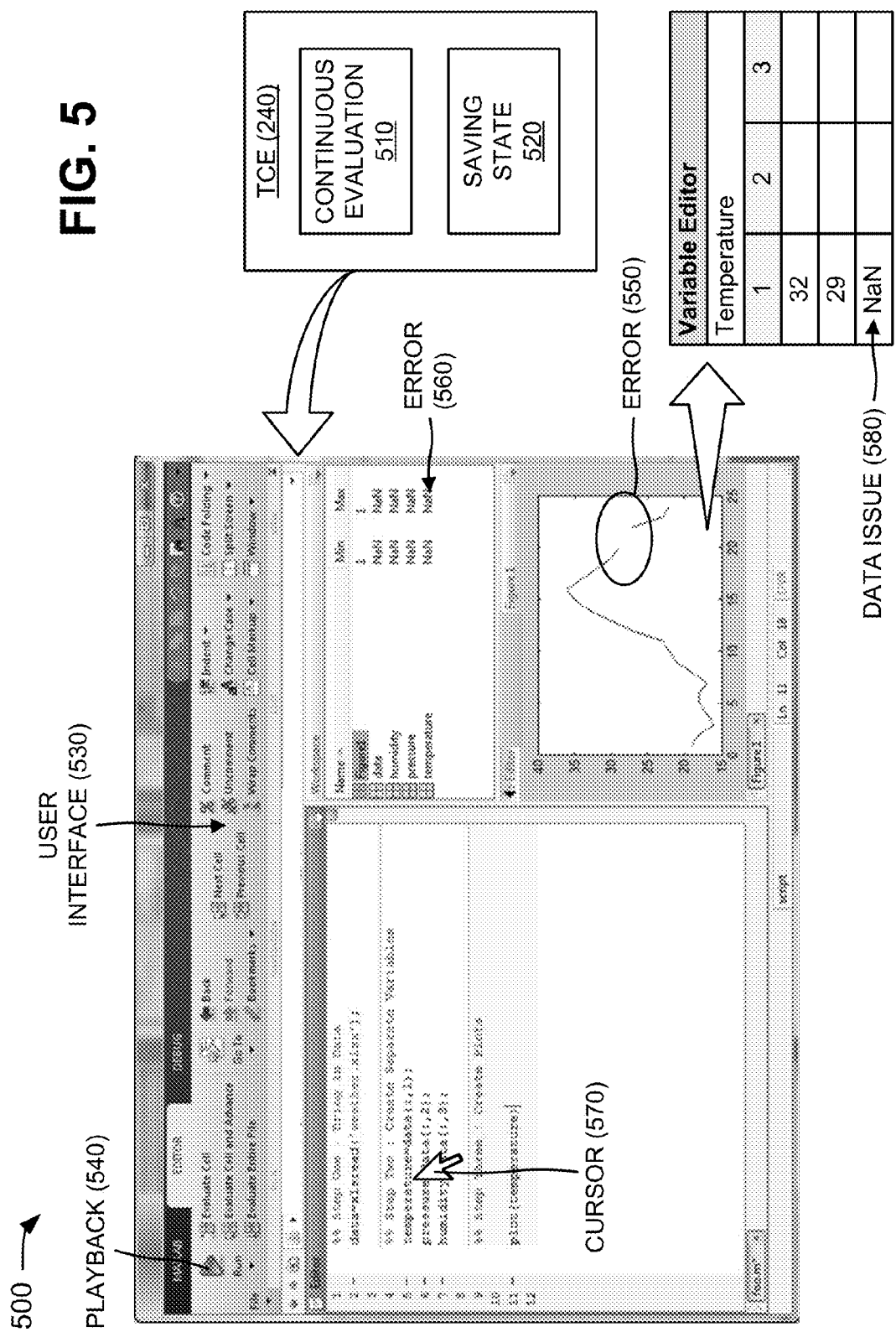

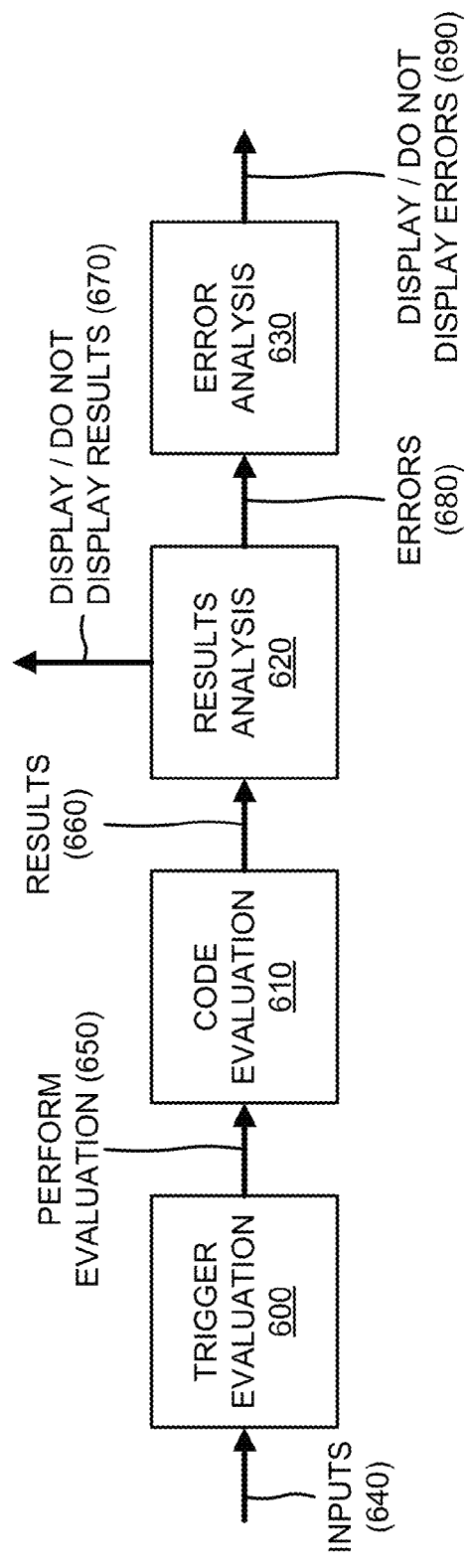

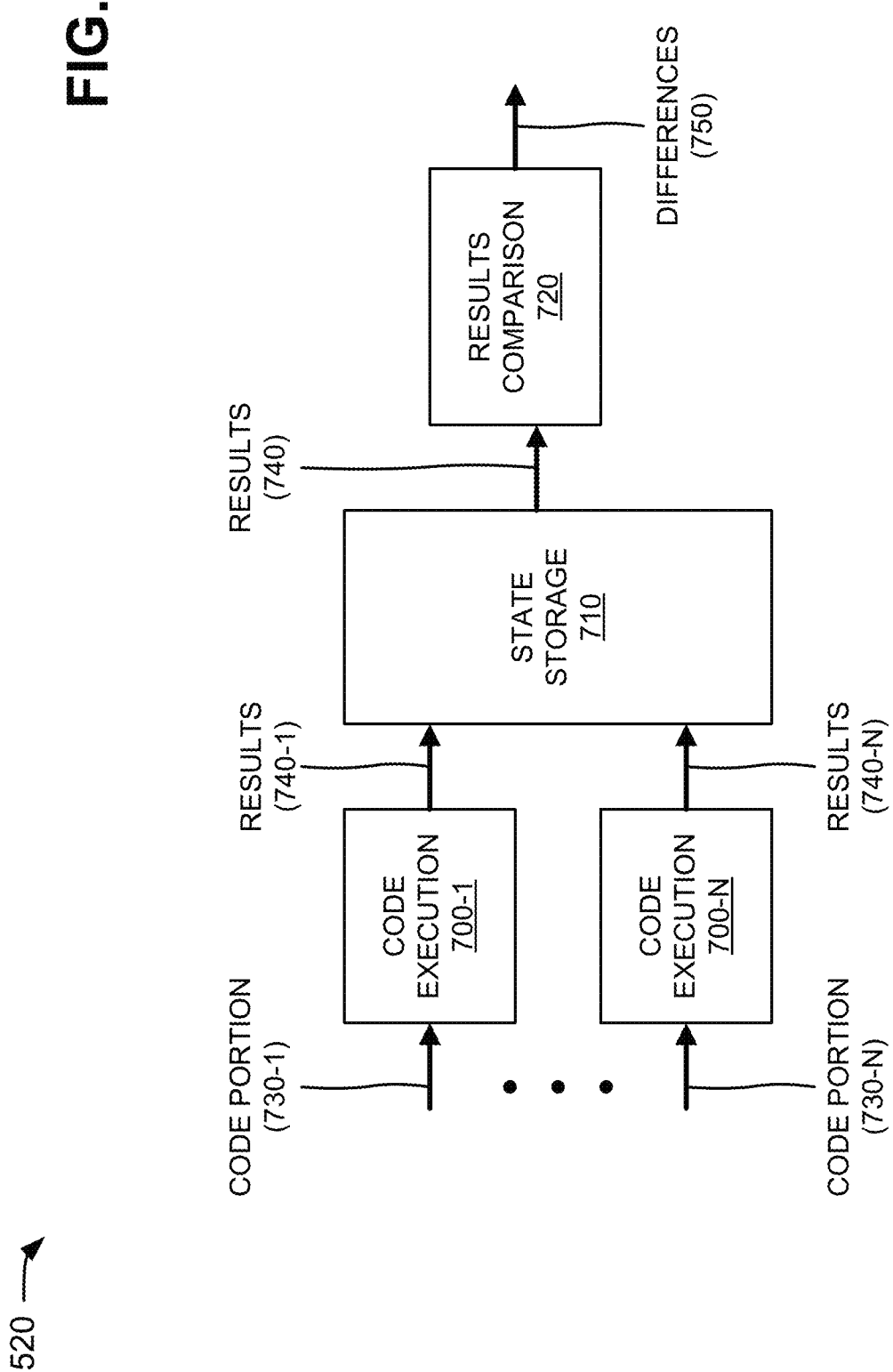

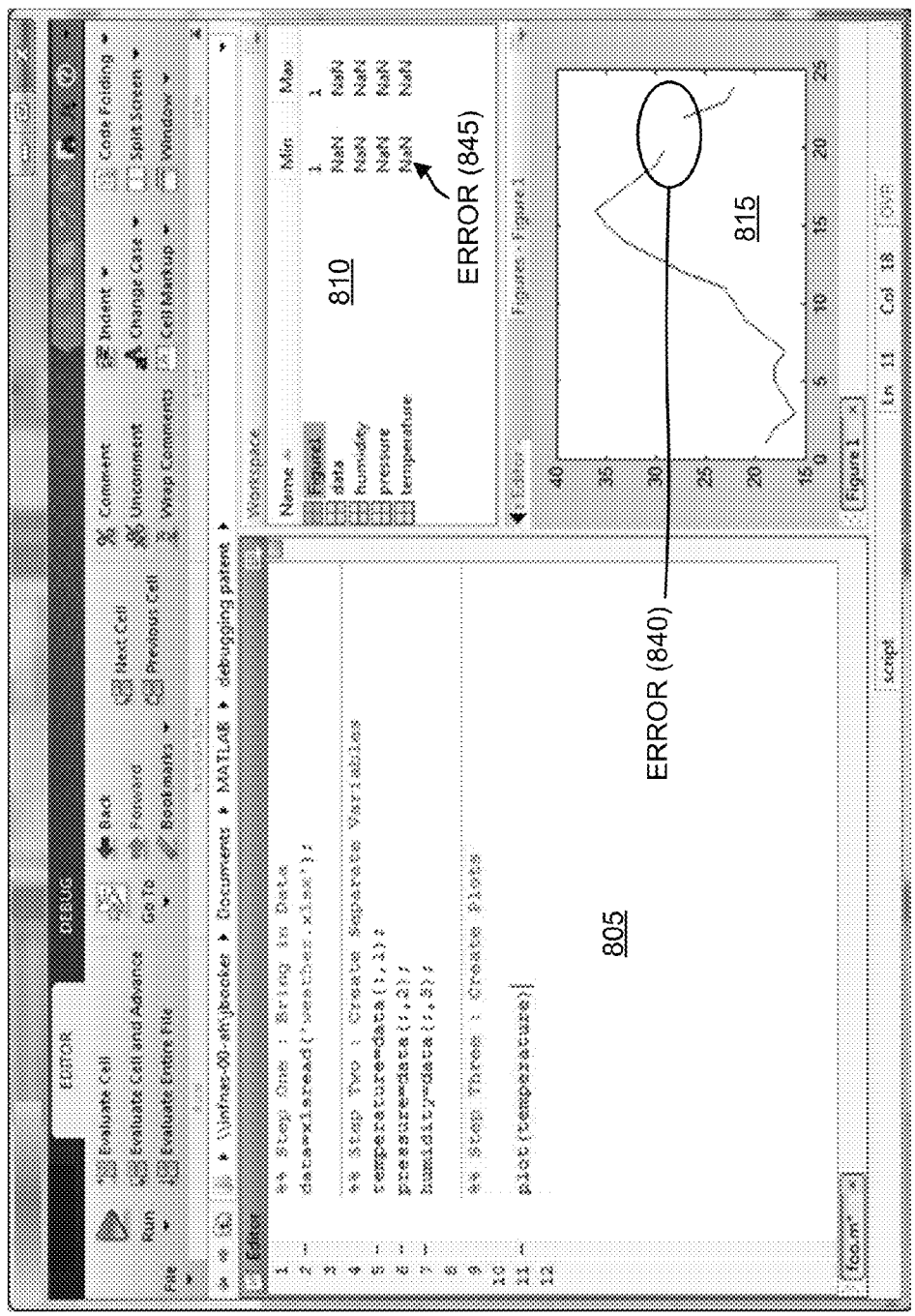

FIG. 8E

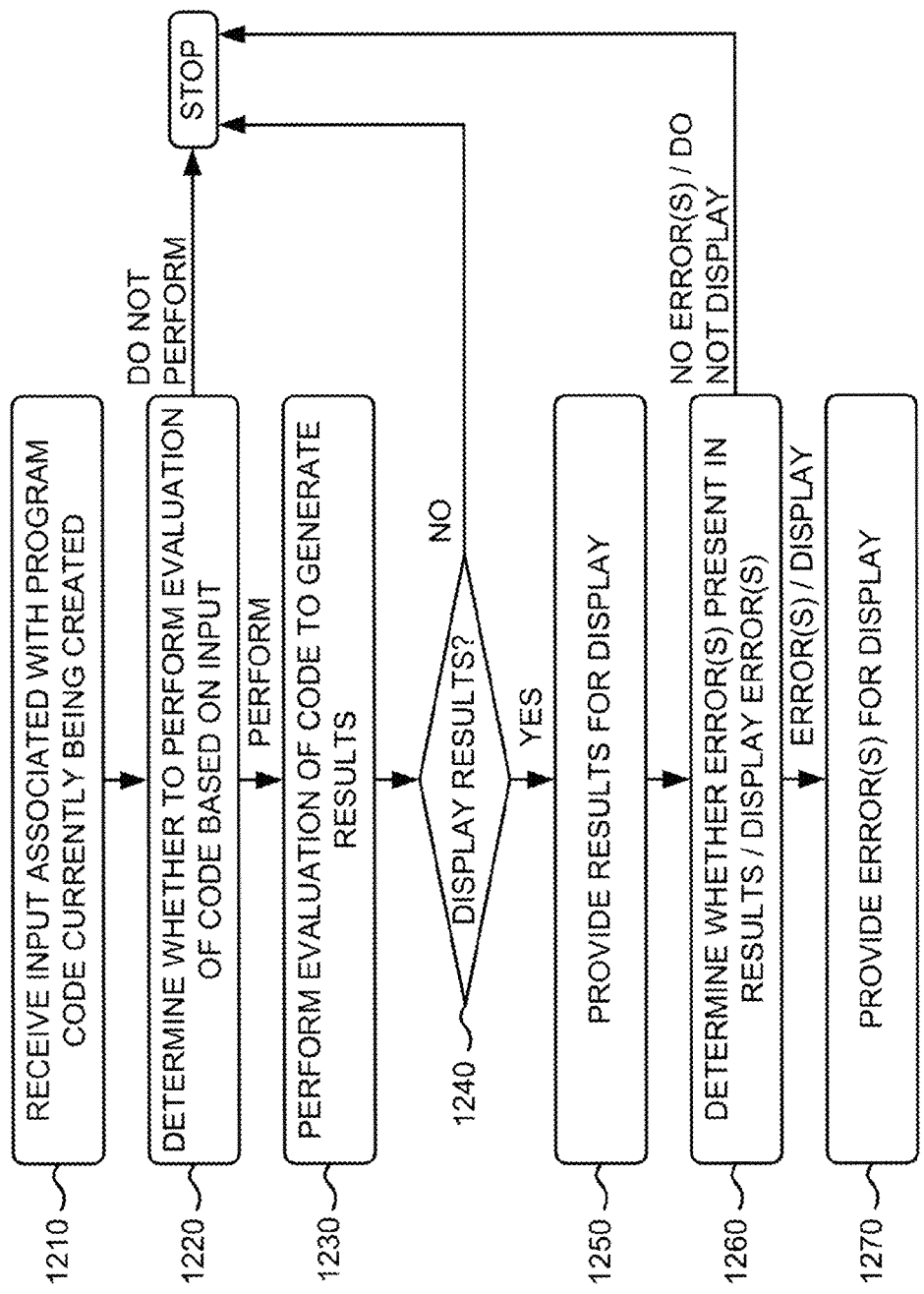

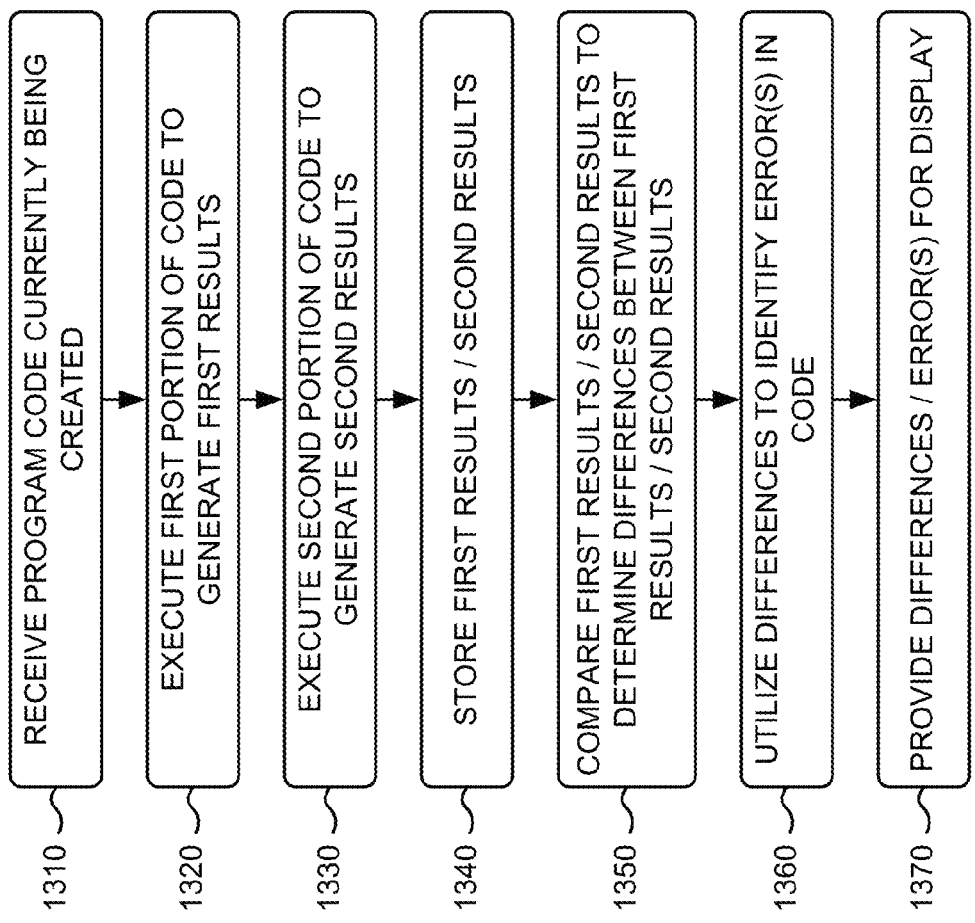

CONTINUOUS EVALUATION OF PROGRAM CODE AND SAVING STATE INFORMATION ASSOCIATED WITH PROGRAM CODE

BRIEF DESCRIPTION OF THE DRAWINGS

The accompanying drawings, which are incorporated in and constitute a part of this specification, illustrate one or more implementations and, together with the description, explain these implementations. In the drawings:

FIG. 1 is a diagram of an overview of an example implementation described herein;

FIG. 2 is a diagram of an example environment in which systems and/or methods described herein may be implemented;

FIG. 3 is a diagram of example components of one or more of the devices of the environment depicted in FIG. 2;

FIG. 4 is a diagram of example functional components of a technical computing environment (TCE) that may be used by one or more of the devices of the environment depicted in FIG. 2;

FIG. 5 is a diagram of example operations capable of being performed by the TCE;

FIG. 6 is a diagram of example functional components of a continuous evaluation component of the TCE;

FIG. 7 is a diagram of example functional components of a saving state component of the TCE;

FIGS. 8A-8F are diagrams of an example user interface capable of being generated by the TCE;

FIG. 12 is a flow chart of an example process for continuously evaluating program code; and FIG. 13 is a flow chart of an example process for saving state information associated with program code.

DETAILED DESCRIPTION

Figure 8A:
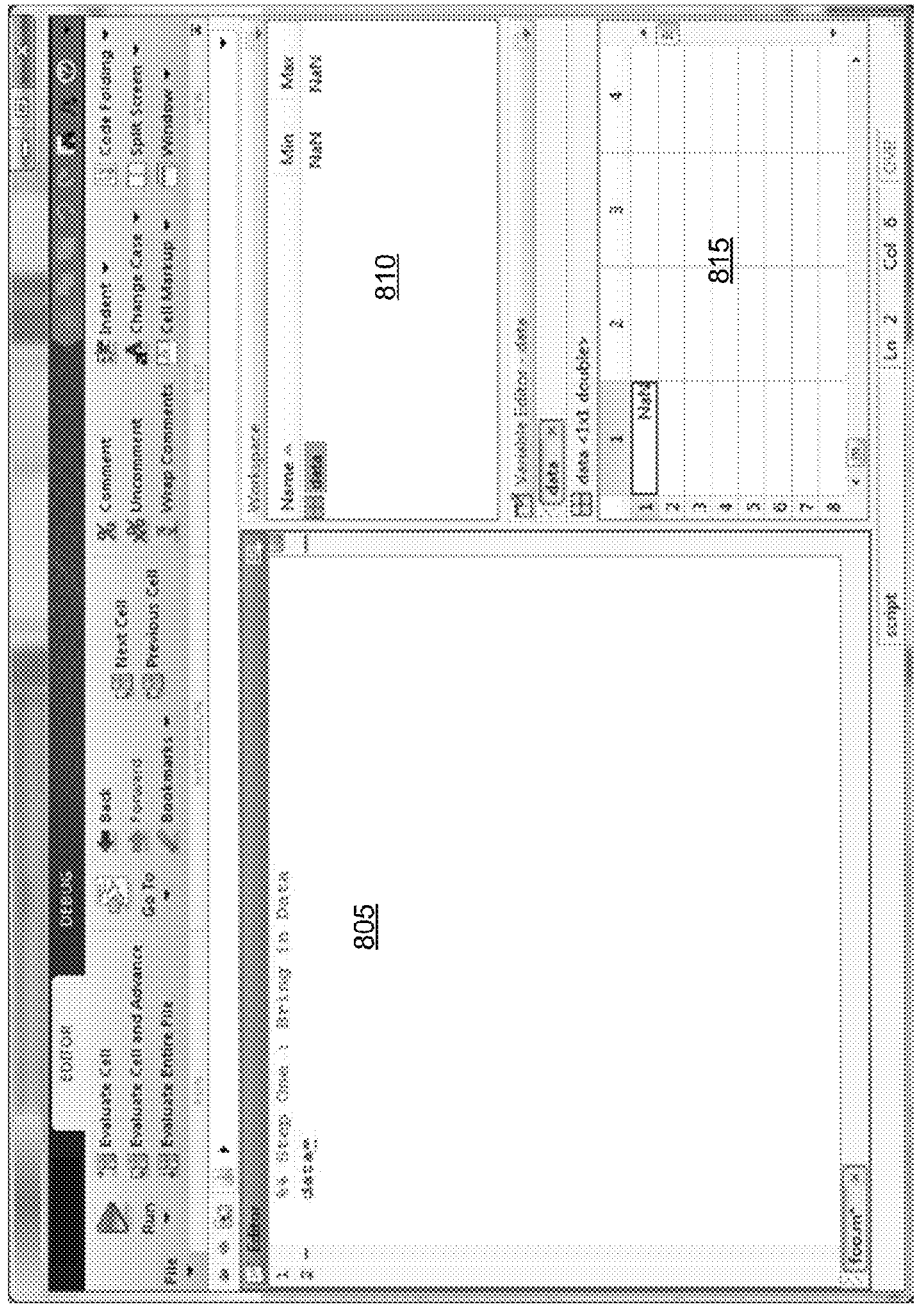

The following detailed description refers to the accompanying drawings. The same reference numbers in different drawings may identify the same or similar elements.

Programmers can use a programming language to build functions, modules, applications, etc. by writing text files containing code in the programming language. The programmer may utilize an editor of a computing environment to create the program code. Once the program code is written, the programmer may test the program code. Some programmers use a debugger to understand and test the behavior of the program code and to spot errors in the program code. If an error is detected, the programmer usually returns to the editor to modify the program code. After modifying the program code, the programmer may utilize the debugger again to see if the error is corrected. This process may continue until the program code is determined to be free of errors.

The programmer may learn about an execution (or runtime) state of the program code by adding statements to the program code and executing the statements (e.g., print statements), by copying portions of the program code into a command window and executing the code portions, by utilizing a debugger, etc. Debugging may include the programmer adding breakpoints at different parts of the program code, and utilizing the breakpoints to investigate the different parts of the program code. The programmer needs to understand what debugging is and how debugging works before the programmer can use the information obtained from debugging the program code. This may present a challenge for novice programmers.

OVERVIEW

Systems and/or methods described herein may enable program code to be continuously evaluated while the program code is being created and/or edited. The systems and/or methods may enable state information, associated with one or more portions of the program code, to be saved and utilized to determine differences between the portion(s) of the program code. The systems and/or methods may continuously execute the program code in the background, and may provide a live view (or workspace) of results of the code execution at each line of the program code. The results may include information associated with a line of the program code, such as variable values, inputs, outputs, errors, etc.

FIG. 1 is a diagram of an overview of an example implementation described herein. As shown in FIG. 1, a computing environment, such as a technical computing environment (TCE), may include a continuous evaluation component and a saving state component. The continuous evaluation component may enable a program code to be evaluated while the program code is being created and/or edited. The saving state component may enable state information, associated with one or more portions of the program code, to be saved and utilized to determine differences between the one or more portions of the program code.

As further shown in FIG. 1, the TCE, via the continuous evaluation component and the saving state component, may provide a user interface that enables a user (e.g., a programmer) to create and/or edit the program code while simultaneously viewing results of the continuous evaluation of the program code. For example, the user interface may include an editor section (e.g., a window) that enables the user to create, view, edit, etc. the program code. The user interface may include a workspace section (e.g., a window) that displays information associated with variables (e.g., inputs, outputs, intermediate variables) of the program code provided in the editor section. The information displayed in the workspace section may change when the user selects different portions of the program code. The user interface may include a variable editor section (e.g., a window) that displays information associated with the variables of the program code. For example, the variable editor section may display a graph generated by the program code.

The user interface may include a mechanism that, when selected, permits the user to playback lines of the program code. In one example, the playback mechanism may enable the user to step though the lines of the program code and see what effect each line has on the variables of the program code. As further shown in FIG. 1, the variable editor section may display a plot of a temperature variable of the program code. The plot may include an error (e.g., a break in the plotted line). The workspace section may display an error (e.g., a not a number (NaN) indication) associated with the temperature variable, which may cause the error in the plot. The user may use a cursor (or some other selection mechanism) to select the portion of the program code that includes the temperature variable. When the temperature variable is selected, the variable editor section may display data associated with the temperature variable (e.g., instead of the plot). The data may include a data issue (e.g., a NaN indication) that may be corrected by the user.

Such an arrangement may enable a programmer to see errors associated with particular lines of the program code, as the particular lines are written, rather than after the entire program is written. Writing program code may involve maintaining concentration. If the programmer needs to stop writing the program code, in order to execute the code (e.g., in a debugger), the programmer may lose the entire context of where the programmer is in writing the program code. It may be costly for the programmer to return to the correct portion of the program code. The user interface depicted in FIG. 1 keeps the programmer in the program code while allowing the programmer to see how each line of the program code affects the entire program code.

The terms "code" and "program code," as used herein, are to be used interchangeably and are to be broadly interpreted to include text-based code that may require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

Example Environment Arrangement

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow®software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

Graphical models may include entities with relationships between the entities, and the relationships and/or the entities may have attributes associated with them. The entities my include model elements such as blocks 430 and ports. The relationships may include model elements such as lines (e.g., connector lines) and references. The attributes may include model elements such as value information and meta information for the model element associated with the attributes. Graphical models may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

A sample time may be associated with the elements of a graphical model. For example, a graphical model may include a block (e.g., block 430) with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block (e.g., block 430) with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block (e.g., block 430) with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Technical Computing Environment Operations

FIG. 5 is a diagram of example operations 500 capable of being performed by TCE 240 (FIGS. 2-4). TCE 240 may include the features described above in connection with, for example, one or more of FIGS. 1-4. As illustrated in FIG. 5, TCE 240 may include a continuous evaluation component 510 and a saving state component 520. The functions described in connection with continuous evaluation component 510 and saving state component 520 may be performed by one or more components of device 300 (FIG. 3) and/or by one or more devices 300.

Continuous evaluation component 510 may enable a program code to be evaluated while the program code is being created and/or edited. In one example implementation, continuous evaluation component 510 may receive an input associated with program code currently being created by a user (e.g., a programmer). The input may include typing one or more characters in the program code; typing a word in the program code; typing a semicolon in the program code; executing a test on the program code; pausing of typing in the program code; executing a static analysis engine on the program code; expiration of a period of time that the programmer is working on the program code; etc.

Continuous evaluation component 510 may determine whether to perform an evaluation on the program code based on the received input. For example, if the input includes typing a single character, continuous evaluation component 510 may determine not to perform the evaluation. Alternatively, or additionally, if the input includes typing a word in the program code, continuous evaluation component 510 may determine to perform the evaluation. The evaluation may include executing one or more portions of the program code; executing the entire program code; executing a statistical analysis on the program code (e.g., code coverage statistics); executing a static analysis on the program code; executing other tools (e.g., a profiler that determines time and computer resources utilized for execution) on the program code; etc.

If continuous evaluation component 510 determines not to perform the evaluation, continuous evaluation component 510 may do nothing and wait for another input from the programmer. If continuous evaluation component 510 determines to perform the evaluation, continuous evaluation component 510 may perform the evaluation of the program code to generate results. The results may include information associated with variables (e.g., inputs, outputs, intermediate variables) of the program code; information associated with errors discovered in the program code; information associated with tests and/or analyses performed on the program code; etc.

Continuous evaluation component 510 may determine whether to display the results. For example, if the results indicate an error in the program code, an unexecuted portion (e.g., a line) of the program code, an inefficient portion (e.g., a line) of the program code, etc., continuous evaluation component 510 may determine to display the results. Alternatively, or additionally, if the results indicate that the program code contains no errors, continuous evaluation component 510 may determine to not display the results. If continuous evaluation component 510 determines to not display the results, continuous evaluation component 510 may do nothing and wait for another input from the programmer. If continuous evaluation component 510 determines to display the results, continuous evaluation component 510 may provide the results for display (e.g., to the programmer).

Alternatively, or additionally, continuous evaluation component 510 may determine whether one or more errors are present in the results and whether to display the error(s). For example, continuous evaluation component 510 may determine an error is present in the program code when the program code contains unrecognized syntax, a line that will not execute, a line that requires an inordinate amount of time to execute (e.g., greater than a threshold), etc. Continuous evaluation component 510 may determine to display an error when the error includes a line that will not execute, a line that requires an inordinate amount of time to execute, etc. Alternatively, or additionally, continuous evaluation component 510 may determine to not display an error when the error is due to the programmer typing a character of syntax (e.g., a command) but not finishing the syntax prior to the evaluation.

If continuous evaluation component 510 determines error(s) in the results and determines to not display the error(s), continuous evaluation component 510 may do nothing and wait for another input from the programmer. Alternatively, continuous evaluation component 510 may do nothing and wait for another input from the programmer if continuous evaluation component 510 determines no errors in the results. If continuous evaluation component 510 determines error(s) in the results and to display the error(s), continuous evaluation component 510 may provide the error(s) for display.

Saving state component 520 may enable state information, associated with one or more portions of the program code, to be saved and utilized to determine differences between the one or more portions of the program code. In one example implementation, saving state component 520 may receive program code currently being created by a user (e.g., a programmer), and may execute a first portion (e.g., one or more lines) of the program code to generate first results. Saving state component 520 may execute a second portion (e.g., the one or more lines and/or one or more additional lines) of the program code to generate second results, and may store the first results and the second results.

The first results and/or the second results may include information associated with a state of the program code; variables (e.g., inputs, outputs, intermediate variables) of the program code; information associated with errors discovered in the program code; information associated with tests and/or analyses performed on the program code; etc. The state of the program code may include information contained in a workspace, outputs generated by each line of the program code, errors generated by the program code, time information, live updates of each variable on each line of the program code (e.g., a variable value may change at each line of the code), etc.

Saving state component 520 may compare the first results and the second results to determine one or more differences between the first results and the second results. For example, the first results may provide outputs that are expected for the program code, and the second results may provide outputs that are unexpected for the program code. Saving state component 520 may utilize the determined difference(s) between the first results and the second results to identify one or more errors in the program code. Returning to the previous example, since the second results provide outputs that are unexpected for the program code, saving state component 520 may determine that the second portion of the program code contains an error. Saving state component 520 may further analyze (e.g., execute additional tests on) the second portion of the program code to further determine the reason for the error. Saving state component 520 may provide the difference(s) and/or the error(s) for display to the programmer.

As further shown in FIG. 5, TCE 240, via continuous evaluation component 510 and saving state component 520, may provide a user interface 530 that enables a user (e.g., a programmer) to create and/or edit the program code while simultaneously viewing results of the continuous evaluation of the program code. For example, user interface 530 may include an editor section (e.g., a window) that enables the user to create, view, edit, etc. the program code. User interface 530 may include a workspace section (e.g., a window) that displays information associated with variables (e.g., inputs, outputs, intermediate variables) of the program code provided in the editor section. The information displayed in the workspace section may change when the user selects different portions of the program code. User interface 530 may include a variable editor section (e.g., a window) that displays information associated with the variables of the program code. For example, the variable editor section may display a graph generated by the program code.

User interface 530 may include a mechanism 540 that, when selected, permits the user to playback lines of the program code. In one example, the playback mechanism 540 may enable the user to step though the lines of the program code and see what effect each line has on the variables of the program code. As further shown in FIG. 5, the variable editor section may display a plot of a temperature variable of the program code. The plot may include an error 550, such as, for example, a break in the plotted line. The workspace section may display an error 560 (e.g., a NaN indication) associated with the temperature variable, which may cause error 550 in the plot. The user may use a cursor 570 (or some other selection mechanism) to select the portion of the program code that includes the temperature variable. When the temperature variable is selected with cursor 570, the variable editor section may display data associated with the temperature variable (e.g., instead of the plot). The data may include a data issue 580 (e.g., a NaN indication) that may be corrected by the user.

Such an arrangement may enable a programmer to see errors associated with particular lines of the program code, as the particular lines are written, rather than after the entire program is written. Writing program code may involve maintaining concentration. If the programmer needs to stop writing the program code, in order to execute the code (e.g., in a debugger), the programmer may lose the entire context of where the programmer is in writing the program code. It may be costly for the programmer to return to the correct portion of the program code. User interface 530 may keep the programmer in the program code while allowing the programmer to see how each line of the program code affects the entire program code.

In one example implementation, if the programmer changes a line of the program code contained in the editor section, continuous evaluation component 510 may not need to re-execute the lines of the program code provided before the changed line of the program code. This may be due to saving state component 520 storing information (e.g., variables) associated with execution of the lines of the program code provided before the changed line of the program code. Such an arrangement may save time and computational resources, especially if the lines of the program code that are not re-executed require an inordinate amount of time to execute.

Although FIG. 5 shows example operations capable of being performed by TCE 240, in other implementations, TCE 240 may perform fewer operations, different operations, and/or additional operations than depicted in FIG. 5. Alternatively, or additionally, one or more components of FIG. 5 may perform one or more other tasks described as being performed by one or more other components of FIG. 5.

FIG. 6 is a diagram of example functional components of continuous evaluation component 510 (FIG. 5). In one implementation, the functions described in connection with FIG. 6 may be performed by one or more components of device 300 (FIG. 3) and/or by one or more devices 300. As shown in FIG. 6, continuous evaluation component 510 may include a trigger evaluation component 600, a code evaluation component 610, a results analysis component 620, and an error analysis component 630.

Trigger evaluation component 600 may receive inputs 640 associated with program code currently being created by a user (e.g., a programmer). Inputs 640 may include typing one or more characters in the program code; typing a word in the program code; typing a semicolon in the program code; executing a test on the program code; pausing of typing in the program code; executing a static analysis engine on the program code; expiration of a period of time that the programmer is working on the program code; etc. Trigger evaluation component 600 may determine whether to perform an evaluation on the program code based on inputs 640. For example, if inputs 640 include typing a single character, trigger evaluation component 600 may determine not to perform the evaluation. Alternatively, or additionally, if inputs 640 include typing a word in the program code, trigger evaluation component 600 may determine to perform the evaluation. If the evaluation is to be performed, trigger evaluation component 600 may provide, to code evaluation component 610, a request 650 to perform the evaluation.

If code evaluation component 610 receives request 650, code evaluation component 610 may perform the evaluation of the program code, as provided in request 650. The evaluation may include executing one or more portions of the program code; executing the entire program code; executing a statistical analysis on the program code; executing a static analysis on the program code; executing other tools (e.g., a profiler) on the program code; etc. Code evaluation component 610 may perform the evaluation of the program code to generate results 660. Results 660 may include information associated with variables (e.g., inputs, outputs, intermediate variables) of the program code; information associated with errors discovered in the program code; information associated with tests and/or analyses performed on the program code; etc. Code evaluation component 610 may provide results 660 to results analysis component 620.

Results analysis component 620 may receive results 660, and may determine whether to display results 660. For example, if results 660 indicate an error in the program code, an unexecuted portion of the program code, an inefficient portion of the program code, etc. results analysis component 620 may provide results 660 for display, as indicated by reference number 670. Alternatively, or additionally, if results 660 indicate that the program code contains no errors, results analysis component 620 may not display results 660, as further indicated by reference number 670.

Results analysis component 620 may determine whether one or more errors 680 are present in results 660. For example, results analysis component 620 may determine an error is present in results 660 when the program code contains unrecognized syntax, a line that will not execute, a line that requires an inordinate amount of time to execute, etc. If errors 680 are found in results 660, results analysis component 620 may provide errors 680 to error analysis component 630.

Error analysis component 630 may receive errors 680, and may determine whether or not to display errors 680. Error analysis component 630 may determine to display errors 680 when errors 680 include a line that will not execute, a line that requires an inordinate amount of time to execute, etc. Alternatively, or additionally, error analysis component 630 may determine to not display errors 680 when errors 680 are due to the programmer typing a character of syntax (e.g., a command) but not finishing the syntax prior to the evaluation. If error analysis component 630 determines to not display errors 680, error analysis component 630 may not display errors 680, as indicated by reference number 690. If error analysis component 630 determines to display errors 680, error analysis component 630 may provide errors 680 for display, as further indicated by reference number 690.

Although FIG. 6 shows example functional components of continuous evaluation component 510, in other implementations, continuous evaluation component 510 may contain fewer functional components, different functional components, differently arranged functional components, and/or additional functional components than those depicted in FIG. 6. Alternatively, or additionally, one or more functional components of continuous evaluation component 510 may perform one or more other tasks described as being performed by one or more other functional components of continuous evaluation component 510.

FIG. 7 is a diagram of example functional components of saving state component 520 (FIG. 5). In one implementation, the functions described in connection with FIG. 7 may be performed by one or more components of device 300 (FIG. 3) and/or by one or more devices 300. As shown in FIG. 7, saving state component 520 may include code execution components 700-1 through 700-N (collectively referred to herein as "code execution components 700," and, in some instances, singularly as "code execution component 700"), a state storage component 710, and a results comparison component 720.

Code execution components 700 may receive portions 730-1 through 730-N of program code (collectively referred to herein as "code portions 730," and, in some instances, singularly as "code portion 730") currently being created by a user, such as a programmer. Code portions 730 may include one or more lines of the program code. Code execution components 700 may execute corresponding code portions 730 to generate corresponding results 740-1 through 740-N (collectively referred to herein as "results 740," and, in some instances, singularly as "result 740").

Results 740 may include information associated with a state of the program code; variables (e.g., inputs, outputs, intermediate variables) of the program code; information associated with errors discovered in the program code; information associated with tests and/or analyses performed on the program code; etc. The state of the program code may include information contained in a workspace, outputs generated by each line of the program code, errors generated by the program code, time information, live updates of each variable on each line of the program code (e.g., a variable value may change at each line of the code), etc. As further shown in FIG. 7, code execution components 700 may provide results 740 to state storage component 710.

State storage component 710 may include one or more memory devices that receive and store results 740. If the programmer changes a line of the program code, code execution components 700 may not need to re-execute the lines of the program code provided before the changed line of the program code. This may be due to state storage component 710 storing results 740. Such an arrangement may save time and computational resources, especially if the lines of the program code that are not re-executed require an inordinate amount of time to execute. As further shown in FIG. 7, state storage component 710 may provide results 740 to results comparison component 720.

Results comparison component 720 may receive results 740, and may compare results 740 to determine one or more differences 750 between results 740. For example, results 740-1 may provide outputs that are expected for the program code, and results 740-N may provide outputs that are unexpected for the program code. Results comparison component 720 may utilize differences 750 between results 740 to identify one or more errors in the program code. Returning to the previous example, since results 740-N provide outputs that are unexpected for the program code, results comparison component 720 may determine that code portion 730-N contains an error. Results comparison component 720 may further analyze (e.g., execute additional tests on) code portion 730-N to further determine the reason for the error. Results comparison component 720 may provide differences 750 and/or the error(s) for display to the programmer.

Although FIG. 7 shows example functional components of saving state component 520, in other implementations, saving state component 520 may contain fewer functional components, different functional components, differently arranged functional components, and/or additional functional components than those depicted in FIG. 7. Alternatively, or additionally, one or more functional components of saving state component 520 may perform one or more other tasks described as being performed by one or more other functional components of saving state component 520.

Example Technical Computing Environment User Interfaces

FIGS. 8A-8F are diagrams of an example user interface 800 capable of being generated by TCE 240 (FIGS. 2-4). User interface 800 and user interfaces 900-1100 depicted in FIGS. 9-11 (referred to herein, as "user interfaces 800-1100") may include graphical user interfaces (GUIs) or non-graphical user interfaces, such as text-based interfaces. User interfaces 800-1100 may provide information to users via customized interfaces (e.g., proprietary interfaces) and/or other types of interfaces (e.g., browser-based interfaces, etc.). User interfaces 800-1100 may receive user inputs via one or more input devices (e.g., display 310, FIG. 3), may be user-configurable (e.g., a user may change the sizes of user interfaces 800-1100, information displayed in user interfaces 800-1100, color schemes used by user interfaces 800-1100, positions of text, images, icons, windows, etc., in user interfaces 800-1100, etc.), and/or may not be user-configurable. Information associated with user interfaces 800-1100 may be selected and/or manipulated by a user of TCE 240 (e.g., via a touch screen display, a mouse, a keyboard, a keypad, voice commands, etc.).

With reference to FIG. 8A, user interface 800 may enable a user (e.g., a programmer) to create and/or edit the program code while simultaneously viewing results of the continuous evaluation of the program code. In one example, user interface 800 may include an editor section 805 that enables the user to create, view, edit, etc. the program code. User interface 800 may include a workspace section 810 that displays information associated with variables (e.g., inputs, outputs, intermediate variables) of the program code provided in editor section 805. The information displayed in workspace section 810 may change when the user selects different portions of the program code in editor section 805. User interface 800 may include a variable editor section 815 that displays information associated with the variables of the program code.

In one example, workspace section 810 and variable editor section 815 may not display information until the programmer enters syntax, in editor section 805, that is recognizable as program code. As shown in FIG. 8A, once the programmer enters the syntax "data=", TCE 240 may recognize the syntax and may evaluate the syntax with continuous evaluation component 510. TCE 240, via user interface 800, may display results of the syntax evaluation in workspace section 810 and variable editor section 815. For example, workspace section 810 may display information associated with "data" (e.g., a maximum value and a minimum value) and variable editor section 815 may display a spreadsheet with values associated with "data."

Figure 8B:
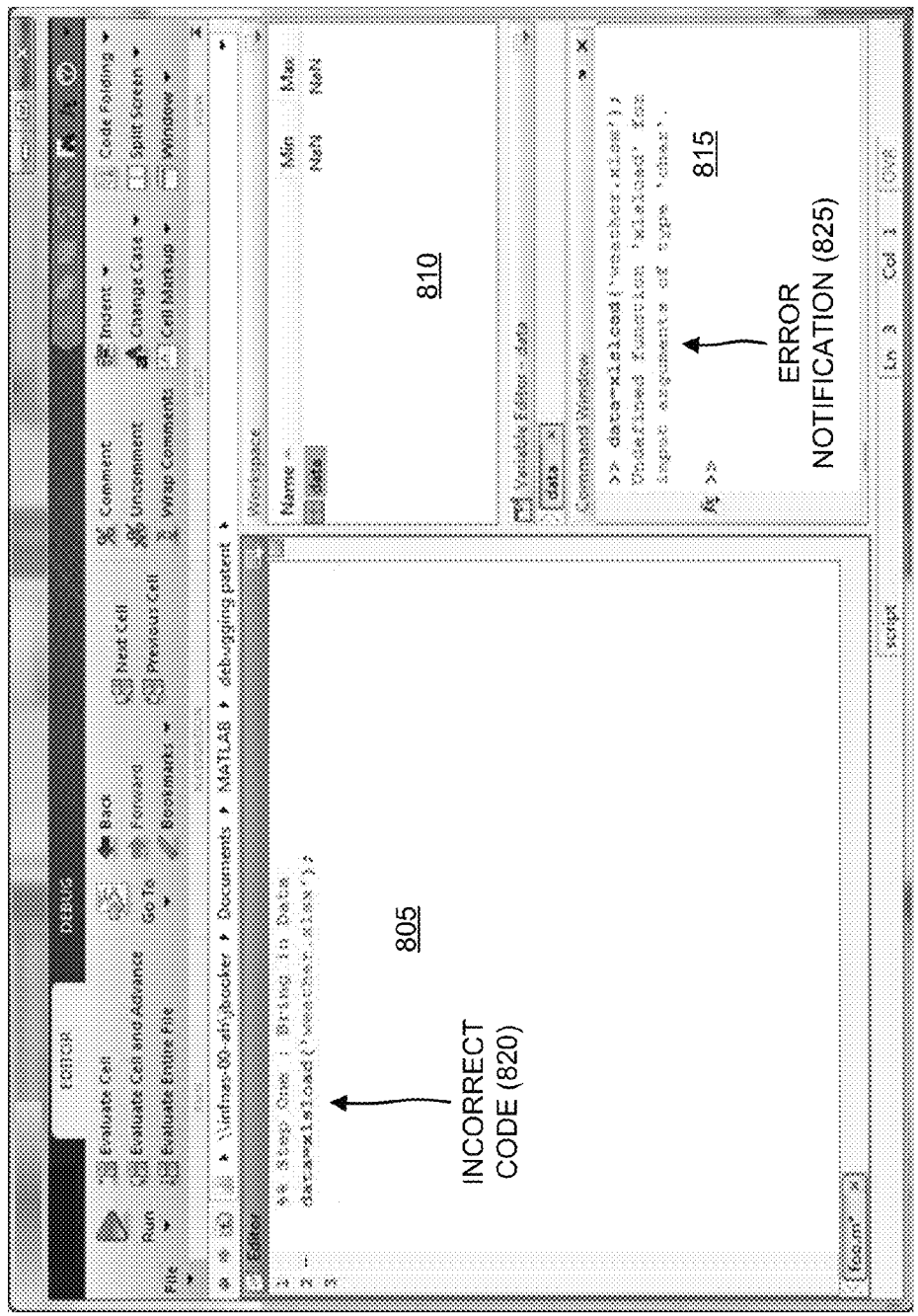

As shown in FIG. 8B, the programmer may continue to enter syntax in the program code of editor section 805, and may enter the syntax "data=xlsload('weather.xlsx');" on the second line of the program code. TCE 240 may evaluate the syntax on the second line of the program code with continuous evaluation component 510. Continuous evaluation component 510 may determine, based on the evaluation, that the second line of the program code includes incorrect code 820. For example, continuous evaluation component 510 may determine that incorrect code includes an undefined function (e.g., "xlsload") for character type input arguments. TCE 240, via user interface 800, may display information associated with incorrect code 820 in variable editor section 815. For example, variable editor section 815 may display an error notification 825 that indicates that the syntax "data=xlsload('weather.xlsx');" includes an undefined function (e.g., "xlsload") for character type input arguments.

Figure 8C:
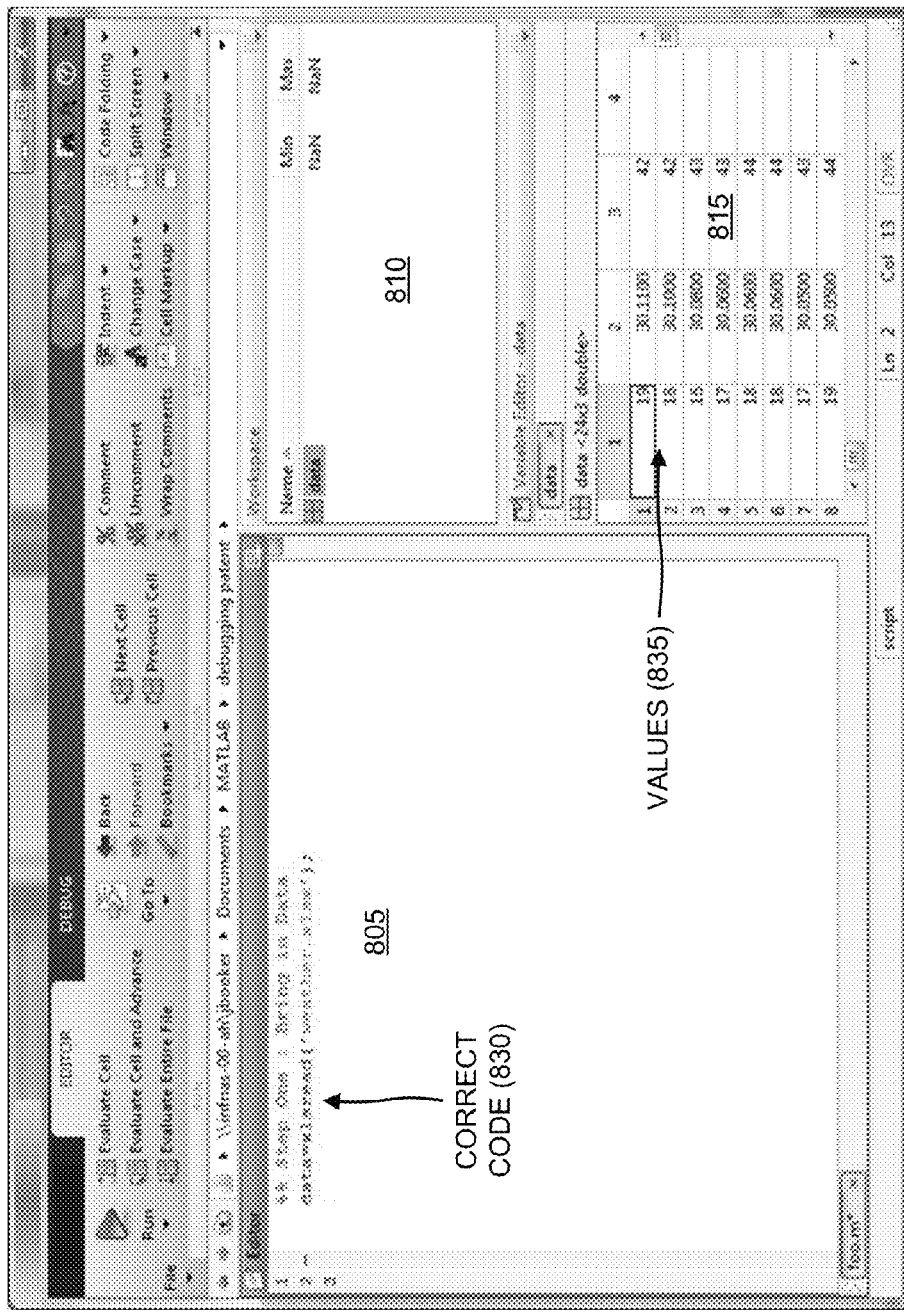

The programmer may see error notification 825, and may correct the second line of the program code. For example, the programmer may utilize editor section 805 to change incorrect code 820 (e.g., "data=xlsload('weather.xlsx');") to correct code 830 (e.g., "data=xlsread('weather.xlsx');"), as shown in FIG. 8C. After correct code 830 is entered by the programmer, TCE 240 may evaluate correct code 830 with continuous evaluation component 510. TCE 240, via user interface 800, may display results of the evaluation of correct code 830 in workspace section 810 and variable editor section 815. For example, workspace section 810 may display information associated with "data" (e.g., a maximum value and a minimum value) and variable editor section 815 may display a spreadsheet with values 835 associated with "data."

The programmer may continue to enter additional lines into the program code of editor section 805, and continuous evaluation component 510 may continuously evaluate the additional lines of the program code, as described above in connection with FIG. 5. Saving state component 520 may store the state information generated by the evaluation of the lines of the program code, as described above in connection with FIG. 5. As shown in editor section 805 of FIG. 8D, the programmer may enter program code associated with a first step (e.g., bringing in data), a second step (e.g., creating separate variables), and a third step (e.g., creating plots).

As further shown in FIG. 8D, the programmer may enter the syntax "plot(temperature)" on the eleventh line of the program code. TCE 240 may evaluate the syntax on the eleventh line of the program code with continuous evaluation component 510. TCE 240, via user interface 800, may display results of the syntax evaluation in workspace section 810 and variable editor section 815. For example, workspace section 810 may display information associated with "data" variables (e.g., humidity, pressure, and temperature) and variable editor section 815 may display a plot associated with the temperature variable. As further shown in FIG. 8D, the plot in variable editor section 815 may include an error 840, such as, for example, a break in the plotted line. Workspace section 810 may display an error 845 (e.g., a NaN indication) associated with the temperature variable, which may cause error 840 in the plot.

Figure 8E:
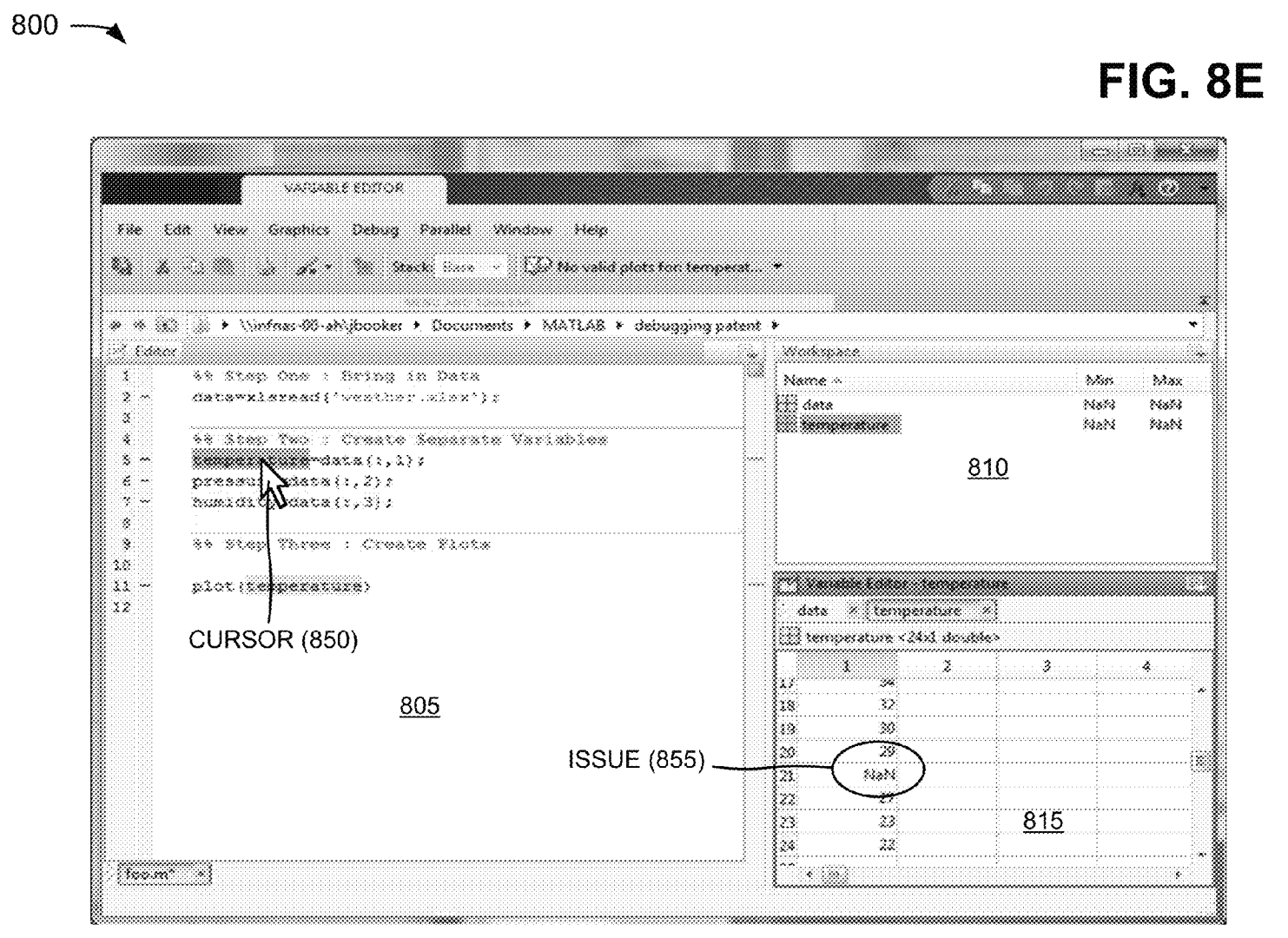

As shown in FIG. 8E, the programmer may use a cursor 850 (or some other selection mechanism) to select the portion of the program code (e.g., the fifth line) that includes the temperature variable. When the temperature variable is selected with cursor 850, variable editor section 815 may display data associated with the temperature variable (e.g., instead of the plot). The data associated with the temperature variable may include an issue 855 (e.g., a NaN indication) that may be corrected by the programmer.

Figure 8F:
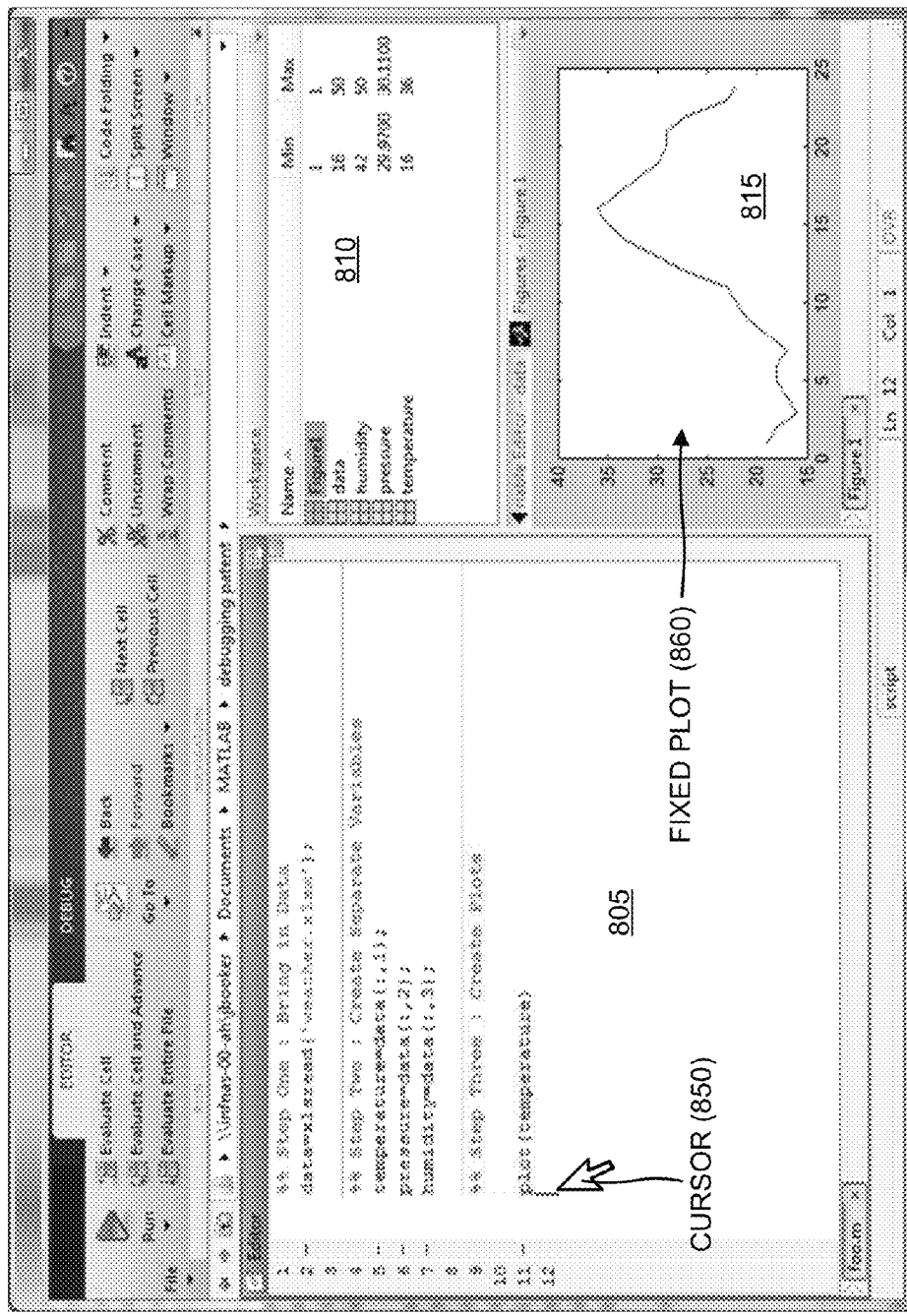

The programmer may correct issue 855 (e.g., by providing a value where the NaN indication is provided) in variable editor section 815, and may utilize cursor 850 to select a portion of the program code (e.g., the twelfth line) after the syntax "plot(temperature)," as shown in FIG. 8F. TCE 240 may evaluate the syntax of the program code with continuous evaluation component 510. TCE 240, via user interface 800, may display results of the syntax evaluation in workspace section 810 and variable editor section 815. For example, workspace section 810 may display information associated with the "data" variables (e.g., humidity, pressure, and temperature) and variable editor section 815 may display a fixed plot 860 associated with the temperature variable. As further shown in FIG. 8F, fixed plot 860 in variable editor section 815 may not include the break in the plotted line since the programmer corrected issue 855. Workspace section 810 may display values (e.g., a minimum value and a maximum value) associated with the temperature variable.

Although user interface 800 depicts a variety of information, in other implementations, user interface 800 may depict less information, different information, differently arranged information, and/or additional information than depicted in FIGS. 8A-8F. In one example implementation, a microphone may be utilized by the user of TCE 240 to provide voice commands to TCE 240. The voice commands may be used in place of and/or in addition to the user inputs described above in connection with FIGS. 8A-8F.

Figure 9:
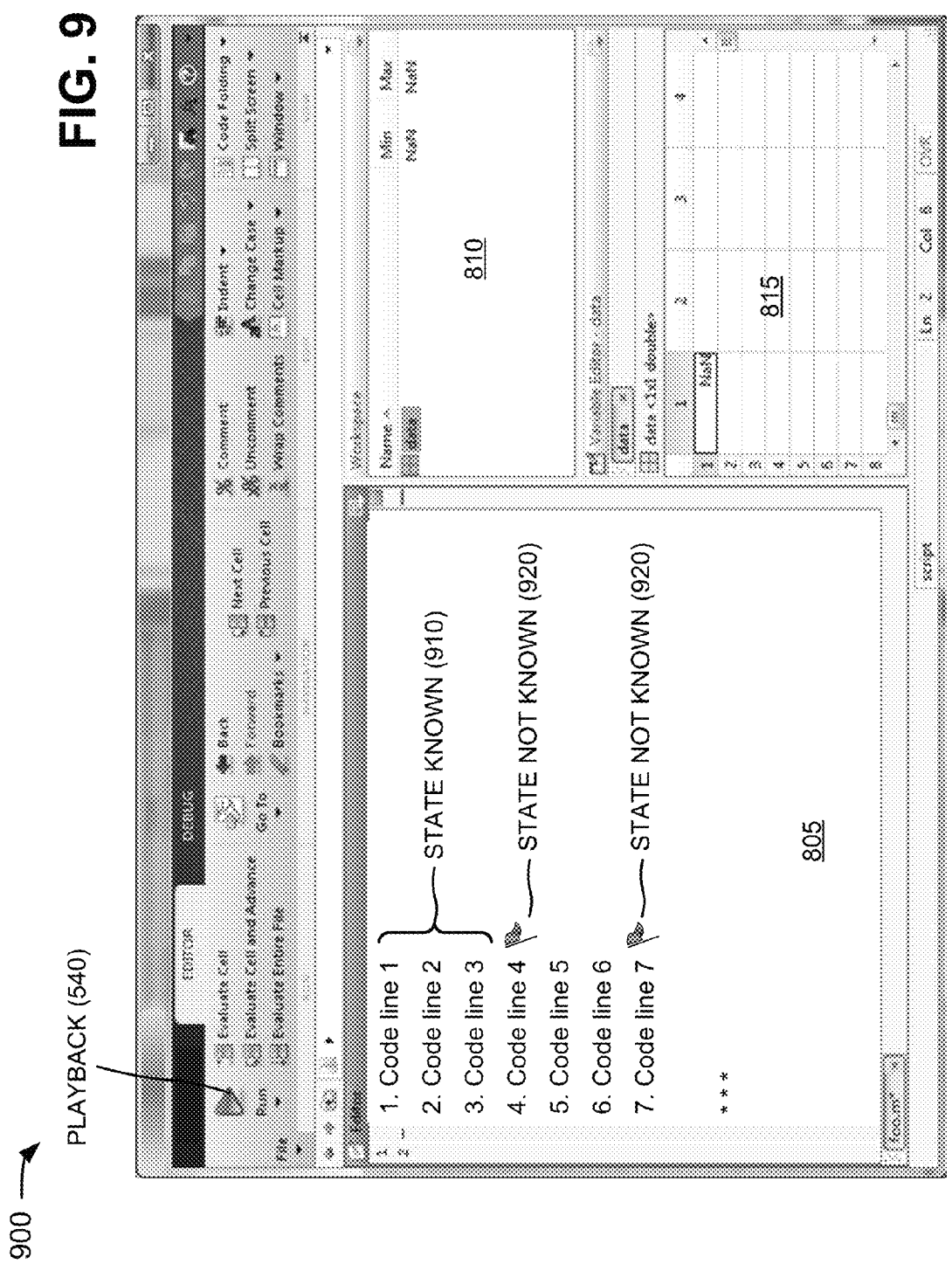
FIG. 9 is a diagram of another example user interface capable of being generated by the TCE.

FIG. 9 is a diagram of another example user interface 900 capable of being generated by TCE 240 (FIGS. 2-4). As shown in FIG. 9, user interface 900 may include editor section 805, workspace section 810, and variable editor section 815. Editor section 805, workspace section 810, and variable editor section 815 may include the features described above in connection with, for example, one or more of FIGS. 8A-8F.

As further shown in FIG. 9, editor section 805 may not display an indicator next to lines of the program code where the state is known, as indicated by reference number 910. The state of a line of the program code may be known when continuous evaluation component 510 of TCE 240 evaluates the line of the program code and results of the evaluation are stored by saving state component 520 of TCE 240. Alternatively, or additionally, the state of a line of the program code may be known when saving state component 520 executes the line of the program code and stores results of the execution (e.g., in state storage 710).

Editor section 805 may display an indicator 920 (e.g., a flag or some other type of indicator) next to lines of the program code where the state is not known. The state of a line of the program code may not be known when continuous evaluation component 510 of TCE 240 has not evaluated the line of the program code. Alternatively, or additionally, the state of a line of the program code may not be known when saving state component 520 has not executed the line of the program code. Alternatively, or additionally, the state of a line of the program code may not be known when continuous evaluation component 510 evaluates the line of the program code but the programmer changes syntax in the line of the program code. Alternatively, or additionally, the state of a line of the program code may not be known when saving state component 520 executes the line of the program code but the programmer changes syntax in the line of the program code.

Indicator 920 may alert the programmer of a need to evaluate and/or execute the lines of the program code where the state is not known. For example, the programmer may utilize playback mechanism 540 to evaluate and/or execute one or more lines of the program code where the state is not known. Such an arrangement may enable a state of the program code to be current and known while the programmer is creating and/or editing the program code.

Although user interface 900 depicts a variety of information, in other implementations, user interface 900 may depict less information, different information, differently arranged information, and/or additional information than depicted in FIG. 9. In one example implementation, a microphone may be utilized by the user of TCE 240 to provide voice commands to TCE 240. The voice commands may be used in place of and/or in addition to the user inputs described above in connection with FIG. 9.

Figure 10A:
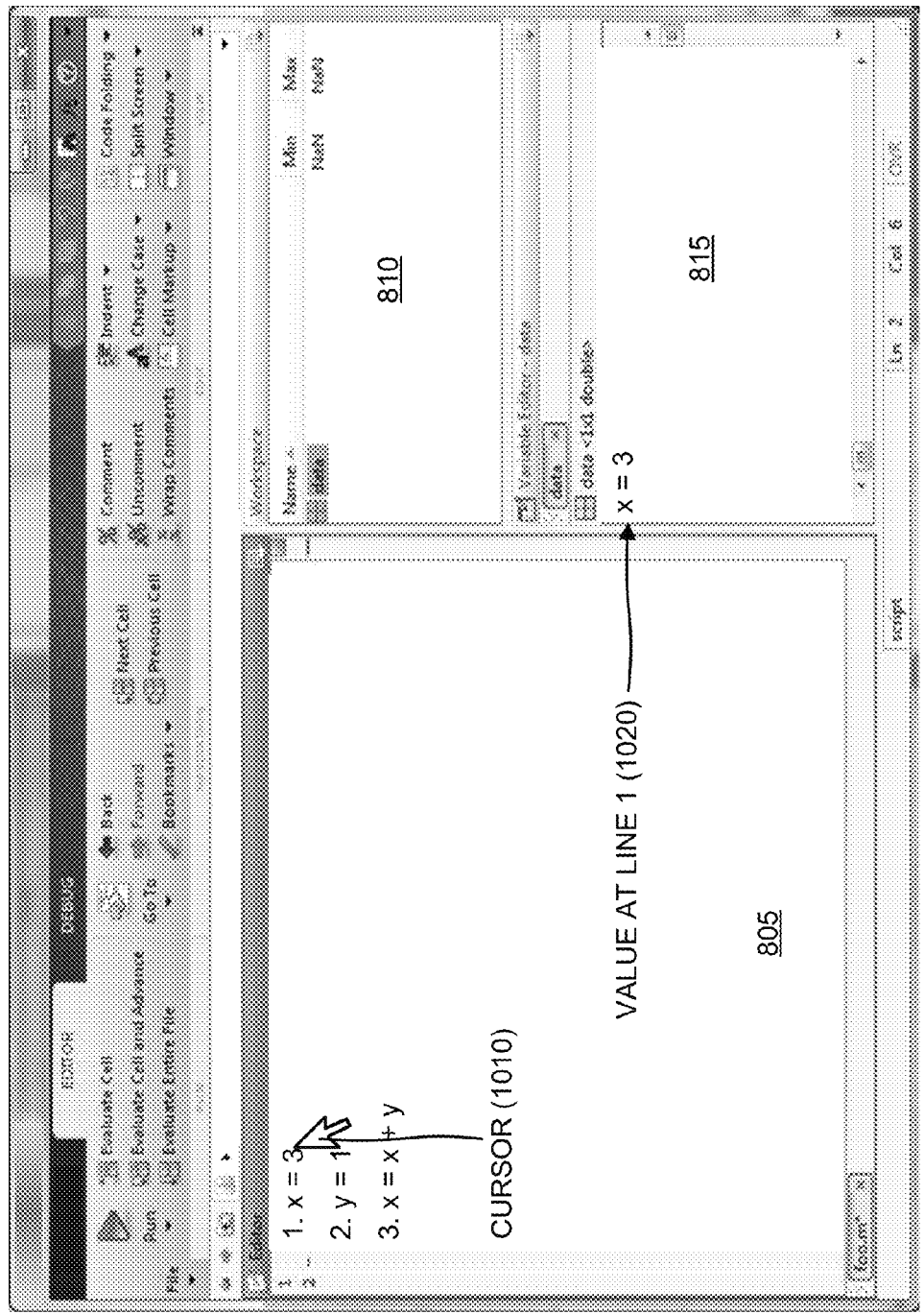
FIGS. 10A and 10B are diagrams of still another example user interface capable of being generated by the TCE.
Figure 10B:
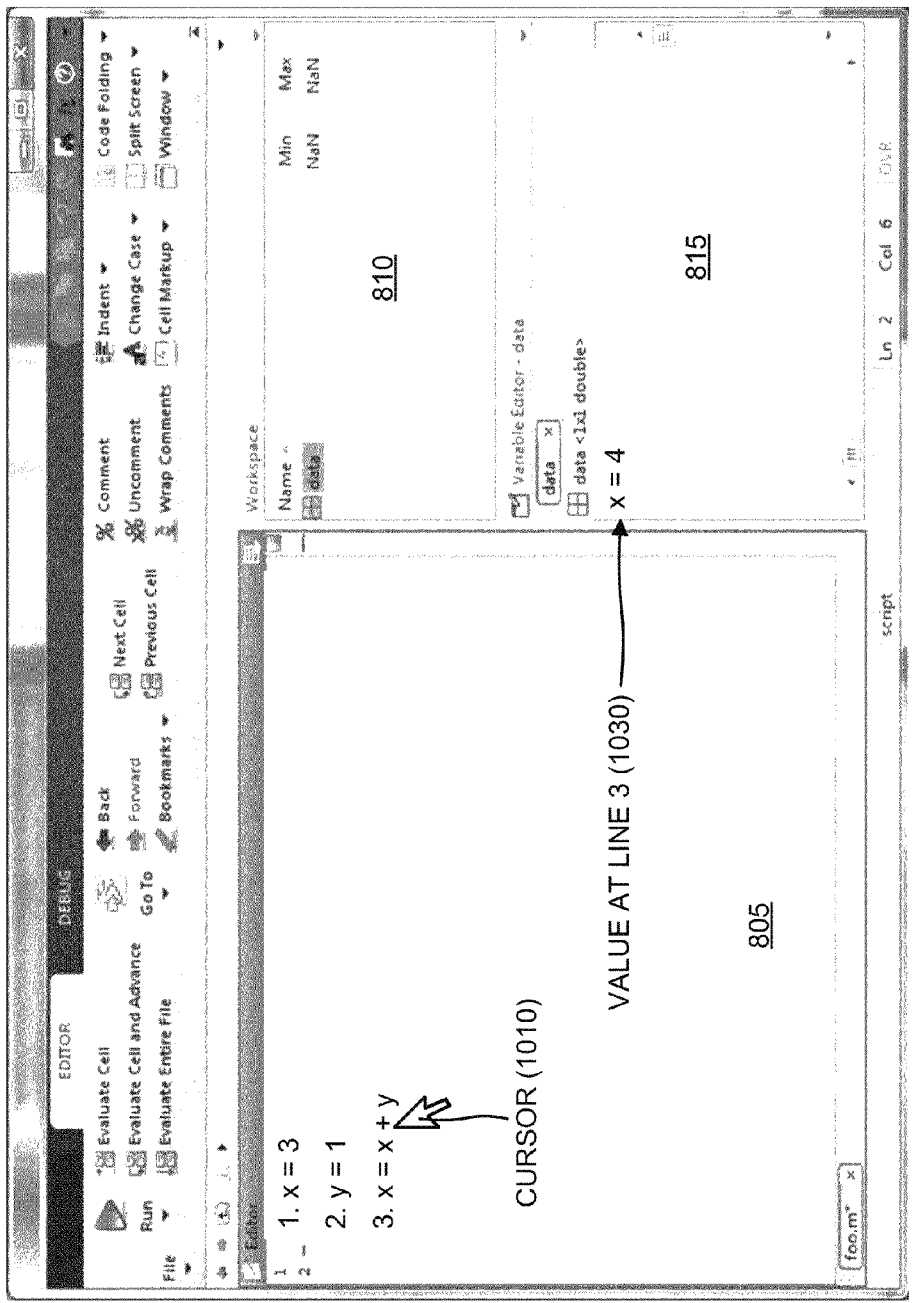

FIGS. 10A and 10B are diagrams of still another example user interface 1000 capable of being generated by TCE (FIGS. 2-4). As shown in FIGS. 10A and 10B, user interface 1000 may include editor section 805, workspace section 810, and variable editor section 815. Editor section 805, workspace section 810, and variable editor section 815 may include the features described above in connection with, for example, one or more of FIGS. 8A-9.

As shown in FIG. 10A, editor section 805 may display three lines of program code that include the variables "x" and "y." A programmer may utilize a cursor 1010 (or some other selection mechanism) to select or hover over a line of the program code. For example, the programmer may utilize cursor 1010 to select or hover over the first line of the program code or a variable contained in the first line. When the first line of the program code is selected (or hovered over), TCE 240 (e.g., via continuous evaluation component 510 and/or saving state component 520) may cause user interface 1000 to display a value of a variable (e.g., "x") contained the first line of the program code in variable editor section 815, as indicated by reference number 1020. For example, variable editor section 815 may display a value of "3" for the variable "x."

As shown in FIG. 10B, the programmer may utilize a cursor 1010 (or some other selection mechanism) to select or hover over another line of the program code. For example, the programmer may utilize cursor 1010 to select or hover over the third line of the program code or a variable contained in the third line. When the third line of the program code is selected (or hovered over), TCE 240 (e.g., via continuous evaluation component 510 and/or saving state component 520) may cause user interface 1000 to display a value of a variable (e.g., "x") contained the third line of the program code in variable editor section 815, as indicated by reference number 1030. For example, variable editor section 815 may display a value of "4" for the variable "x." The programmer may select or hover over any variable at a particular point in the program code, and TCE 240 may cause user interface 1000 to display a value of the selected variable at the particular point in the program code. As shown in FIGS. 10A and 10B, a value of a variable may change at different locations of the program code.

Although user interface 1000 depicts a variety of information, in other implementations, user interface 1000 may depict less information, different information, differently arranged information, and/or additional information than depicted in FIGS. 10A and 10B. In one example implementation, a microphone may be utilized by the user of TCE 240 to provide voice commands to TCE 240. The voice commands may be used in place of and/or in addition to the user inputs described above in connection with FIGS. 10A and 10B.

Figure 11:
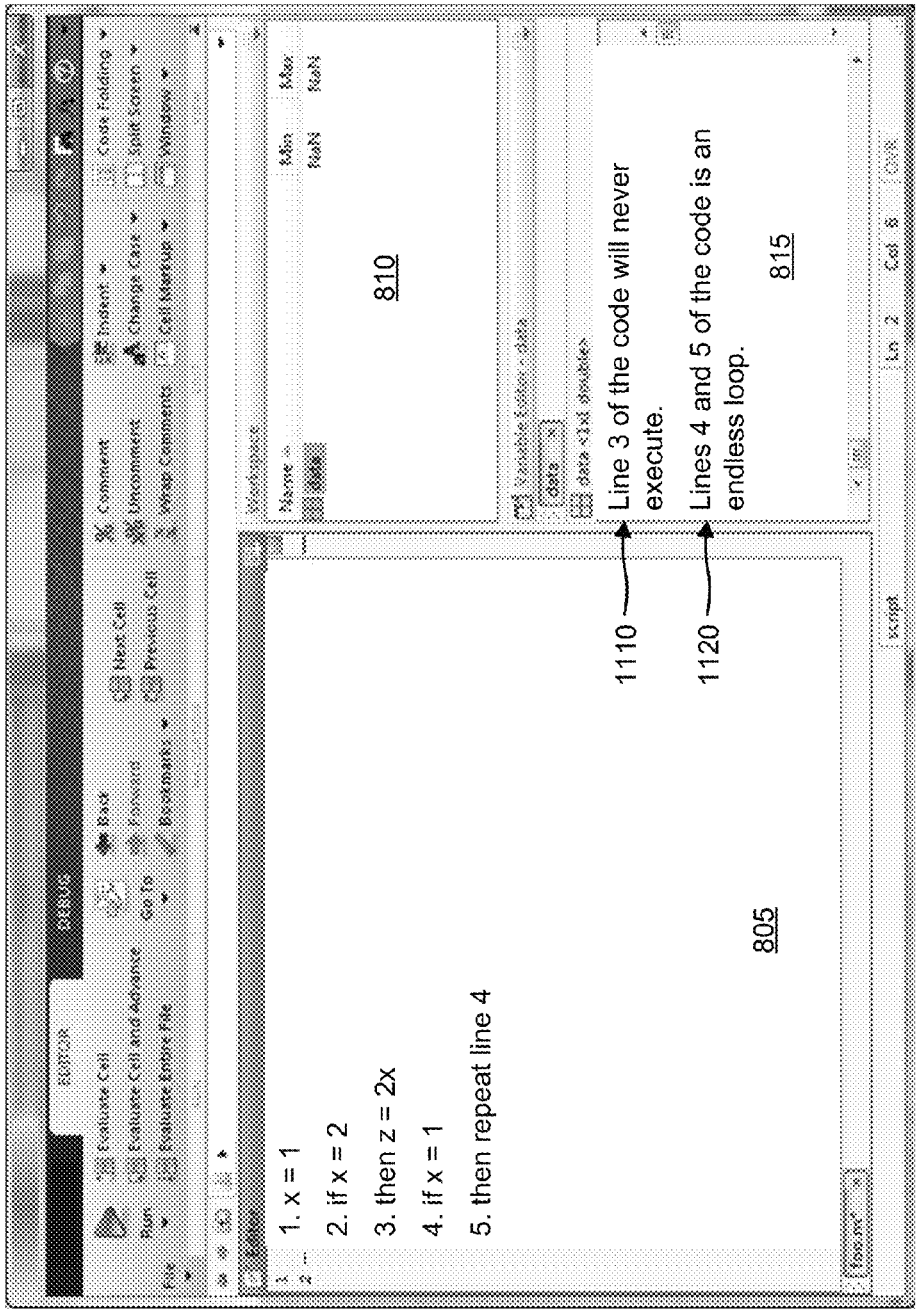
FIG. 11 is a diagram of a further example user interface capable of being generated by the TCE.

FIG. 11 is a diagram of a further example user interface 1100 capable of being generated by TCE (FIGS. 2-4). As shown in FIG. 11, user interface 1100 may include editor section 805, workspace section 810, and variable editor section 815. Editor section 805, workspace section 810, and variable editor section 815 may include the features described above in connection with, for example, one or more of FIGS. 8A-10B.

As shown in FIG. 11, editor section 805 may display five lines of program code that include various variables. Continuous evaluation component 510 may perform an evaluation of the program code to generate results. Based on the results of the evaluation, continuous evaluation component 510 may determine errors in the program code. For example, continuous evaluation component 510 may determine that the third line of the program code will never execute, and that the fourth and fifth lines of the program code result in an endless loop. Because errors were found in the program code, continuous evaluation component 510 may provide the results for display to the programmer. For example, continuous evaluation component 510 may cause variable editor section 815 to display an indication 1110 that the third line of the program code will never execute, and another indication 1120 that the fourth and fifth lines of the program code result in an endless loop.

Although user interface 1100 depicts a variety of information, in other implementations, user interface 1100 may depict less information, different information, differently arranged information, and/or additional information than depicted in FIG. 11. In one example implementation, a microphone may be utilized by the user of TCE 240 to provide voice commands to TCE 240. The voice commands may be used in place of and/or in addition to the user inputs described above in connection with FIG. 11.

In one example implementation, user interfaces 800-1100 may be arranged to display thumbnail images of editor section 805, workspace section 810, variable editor section 815, and/or other sections. If the programmer selects or hovers over one of the thumbnail images, user interfaces 800-1100 may display a larger view of the section associated with the selected thumbnail image. This may enable the programmer to easily navigate between the different sections.

Example Processes

FIG. 12 is a flow chart of an example process 1200 for continuously evaluating program code. In one implementation, process 1200 may be performed by client device 210/TCE 240. Alternatively, or additionally, process 1200 may be performed by another device or a group of devices separate from or including client device 210/TCE 240.

As shown in FIG. 12, process 1200 may include receiving an input associated with a program code currently being created (block 1210), and determining whether to perform an evaluation of the program code based on the input (block 1220). For example, in an implementation described above in connection with FIG. 5, continuous evaluation component 510 may receive an input associated with program code currently being created by a user (e.g., a programmer). The input may include typing one or more characters in the program code; typing a word in the program code; typing a semicolon in the program code; executing a test on the program code; etc. Continuous evaluation component 510 may determine whether to perform an evaluation on the program code based on the received input. The evaluation may include executing one or more portions of the program code; executing the entire program code; executing a statistical analysis on the program code (e.g., code coverage statistics); etc.

As further shown in FIG. 12, if the evaluation is not to be performed (block 1220—DO NOT PERFORM), process 1200 may stop. If the evaluation is to be performed (block 1220—PERFORM), process 1200 may include performing an evaluation of the program code to generate results (block 1230). For example, in an implementation described above in connection with FIG. 5, if continuous evaluation component 510 determines not to perform the evaluation, continuous evaluation component 510 may do nothing and wait for another input from the programmer. If continuous evaluation component 510 determines to perform the evaluation, continuous evaluation component 510 may perform the evaluation of the program code to generate results. The results may include information associated with variables (e.g., inputs, outputs, intermediate variables) of the program code; information associated with errors discovered in the program code; information associated with tests and/or analyses performed on the program code; etc.

Returning to FIG. 12, process 1200 may include determining whether to display the results (block 1240). If the results are not to be displayed (block 1240—NO), process 1200 may stop. If the results are to be displayed (block 1240—YES), process 1200 may include providing the results for display (block 1250). For example, in an implementation described above in connection with FIG. 5, continuous evaluation component 510 may determine whether to display the results. If continuous evaluation component 510 determines to not display the results, continuous evaluation component 510 may do nothing and wait for another input from the programmer. If continuous evaluation component 510 determines to display the results, continuous evaluation component 510 may provide the results for display (e.g., to the programmer).

As further shown in FIG. 12, process 1200 may include determining whether error(s) are present in the results and/or whether to display the error(s) (block 1260). If there are no error(s) to display or the error(s) are not to be displayed (block 1260—NO ERROR(S)/DO NOT DISPLAY), process 1200 may stop. If there are error(s) to display (block 1260—ERROR(S)/DISPLAY), process 1200 may include providing the error(s) for display (block 1270). For example, in an implementation described above in connection with FIG. 5, continuous evaluation component 510 may determine whether one or more errors are present in the result and whether to display the error(s). If continuous evaluation component 510 determines error(s) in the results and determines to not display the error(s), continuous evaluation component 510 may do nothing and wait for another input from the programmer. Alternatively, continuous evaluation component 510 may do nothing and wait for another input from the programmer if continuous evaluation component 510 determines no errors in the results. If continuous evaluation component 510 determines error(s) in the results and to display the error(s), continuous evaluation component 510 may provide the error(s) for display.

FIG. 13 is a flow chart of an example process 1300 for saving state information associated with program code. In one implementation, process 1300 may be performed by client device 210/TCE 240. Alternatively, or additionally, process 1300 may be performed by another device or a group of devices separate from or including client device 210/TCE 240.

As shown in FIG. 13, process 1300 may include receiving program code currently being created (block 1310), executing a first portion of the program code to generate first results (block 1320), and executing a second portion of the program code to generate second results (block 1330). For example, in an implementation described above in connection with FIG. 5, saving state component 520 may receive program code currently being created by a user (e.g., a programmer), and may execute a first portion (e.g., one or more, characters, lines, etc.) of the program code to generate first results. Saving state component 520 may execute a second portion (e.g., the one or more characters, lines, etc. and/or one or more additional characters, lines, etc.) of the program code to generate second results. The first results and/or the second results may include information associated with a state of the program code; variables of the program code; information associated with errors discovered in the program code; information associated with tests and/or analyses performed on the program code; etc.

As further shown in FIG. 13, process 1300 may include storing the first results and the second results (block 1340), and comparing the first results and the second results to determine differences between the first results and the second results (block 1350). For example, in an implementation described above in connection with FIG. 5, saving state component 520 may store the first results and the second results. Saving state component 520 may compare the first results and the second results to determine one or more differences between the first results and the second results. In one example, the first results may provide outputs that are expected for the program code, and the second results may provide outputs that are unexpected for the program code.

Returning to FIG. 13, process 1300 may include utilizing the differences to identify one or more errors in the program code (block 1360), and providing the differences and the error(s) for display (block 1370). For example, in an implementation described above in connection with FIG. 5, saving state component 520 may utilize the determined difference(s) between the first results and the second results to identify one or more errors in the program code. In one example, if the second results provide outputs that are unexpected for the program code, saving state component 520 may determine that the second portion of the program code contains an error. Saving state component 520 may further analyze (e.g., execute additional tests on) the second portion of the program code to further determine the reason for the error. Saving state component 520 may provide the difference(s) and/or the error(s) for display to the programmer.

Conclusion

Systems and/or methods described herein may enable program code to be continuously evaluated while the program code is being created and/or edited. The systems and/or methods may enable state information, associated with one or more portions of the program code, to be saved and utilized to determine differences between the portion(s) of the program code. The systems and/or methods may continuously execute the program code in the background, and may provide a live view (or workspace) of results of the code execution at each line of the program code. The results may include information associated with a line of the program code, such as variable values, inputs, outputs, errors, etc.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 12 and 13, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A device comprising:
one or more processors programmed with executable instructions to:

receive program code that includes a first portion of the program code and a second portion of the program code,
  the first portion of the program code including one or more lines of the program code,
  the first portion of the program code being before the second portion of the program code,
execute the first portion of the program code to generate a first result,
store the first result,
receive a change to a line of the program code included in the second portion of the program code,
  the one or more lines of the program code included in the first portion of the program code being provided before the change to the line of the program code included in the second portion of the program code, and
execute, based on the change to the line of the program code, the second portion of the program code to generate a second result based on the stored first result and without re-executing the first portion of the program code.

2. The device of claim 1, where the first result and the second result include one or more of:
information associated with a state of the program code,
information associated with a variable of the program code,
information associated with one or more errors discovered in the program code, or
information associated with one or more tests performed on the program code.

3. The device of claim 2,
where the first result and the second result include the information associated with the state of the program code, and
where the information associated with the state of the program code includes one or more of:
  information associated with one or more outputs generated by a line of the program code,
  information associated with one or more errors generated by the program code,
  time information, or
  live updates of the variable.

4. The device of claim 1,
where the one or more processors are further to:
  determine a difference between the first result and the second result, and
where the difference includes:
  the first result providing a first output that is expected for the program code, and
  the second result providing a second output that is unexpected for the program code.

5. The device of claim 1, where the program code includes code created with a dynamically-typed programming language.

6. A method, comprising:
receiving program code that includes a first portion of the program code and a second portion of the program code,
  the receiving the first portion of the program code being performed by one or more devices,
  the first portion of the program code including one or more lines of the program code, and
  the first portion of the program code being before the second portion of the program code;
executing the first portion of the program code to generate a first result,
  the executing the first portion being performed by the one or more devices;
storing the first result,
  the storing the first result being performed by the one or more devices;
receiving a change to a line of the program code included in the second portion of the program code,
  the one or more lines of the program code included in the first portion of the program code being provided before the change to the line of the program code included in the second portion of the program code, and
  the receiving the second portion of the program code being performed by the one or more devices; and
executing, based on the change to the line of the program code, the second portion of the program code to generate a second result based on the stored first result and without re-executing the first portion of the program code,
  the executing the second portion being performed by the one or more devices.

7. The method of claim 6, where the first result and the second result include one or more of:
information associated with a state of the program code,
information associated with a variable of the program code,
information associated with one or more errors discovered in the program code, or
information associated with one or more tests performed on the program code.

8. The method of claim 7,
where the first result and the second result include the information associated with the state of the program code, and
where the information associated with the state of the program code includes one or more of:
  information associated with one or more outputs generated by a line of the program code,
  information associated with one or more errors generated by the program code,
  time information, or
  live updates of the variable.

9. The method of claim 6, further comprising:
determining a difference between the first result and the second result,
  where the difference includes:
    the first result providing a first output that is expected for the program code, and
    the second result providing a second output that is unexpected for the program code.

10. The method of claim 6,
where the program code includes code created with a dynamically-typed programming language, and
where receiving the first portion of the program code includes:
  receiving the first portion of the program code via a technical computing environment.

11. One or more non-transitory computer-readable media storing instructions, the instructions comprising:
one or more instructions that, when executed by a processor of a device, cause the processor to:
  receive program code that includes a first portion of the program code and a second portion of the program code,
    the first portion of the program code including one or more lines of the program code, the first portion of the program being before the second portion of the program code,
execute the first portion of the program code to generate a first result,
store the first result,
receive a change to a line of the program code included in the second portion of the program code, and
the one or more lines of the program code included in the first portion of the program code being provided before the change to the line of the program code included in the second portion of the program code, and
execute, based on the change to the line of the program code, the second portion of the program code to generate a second result based on the stored first result and without re-executing the first portion of the program code.

12. The one or more non-transitory computer-readable media of claim 11, where the first result and the second result include one or more of:
information associated with a state of the program code,
information associated with a variable of the program code,
information associated with one or more errors discovered in the program code, or
information associated with one or more tests performed on the program code.

13. The one or more non-transitory computer-readable media of claim 12,
where the first result and the second result include the information associated with the state of the program code, and
where the state of the program code includes one or more of:
information associated with one or more outputs generated by each line of the program code,
information associated with one or more errors generated by the program code,
time information, or
live updates of the variable.

14. The one or more non-transitory computer-readable media of claim 11,
where the instructions further comprise:
one or more instructions that, when executed by the processor, cause the processor to:
determine a difference between the first result and the second result, and
where the difference includes:
the first result providing a first output that is expected for the program code, and
the second result providing a second output that is unexpected for the program code.

15. The method of claim 6, further comprising:
identifying an error in the program code based one or more of the first result or the second result,
determining to provide information regarding the error for display based on a content of the error or a cause of the error, and
providing, for display, the information regarding the error based on determining to provide the information regarding the error.

16. The device of claim 1,
where the first result includes information associated with a state of the program code, and
where the state of the program code includes live updates of variables on the one or more lines of the program code.

17. The device of claim 16,
where the one or more lines of the program code include a first line and a second line,
where the live updates include:
a first value, of a variable of the variables, on the first line, and
a second value of the variable on the second line, and
where the second value is different from the first value.

18. The method of claim 6,
where the first result includes information associated with a state of the program code, and
where the state of the program code includes live updates of variables on the one or more lines of the program code.

19. The method of claim 18,
where the one or more lines of the program code include a first line and a second line,
where the live updates include:
a first value, of a variable of the variables, on the first line, and
a second value of the variable on the second line, and
where the second value is different from the first value.

20. The one or more non-transitory computer-readable media of claim 11,
where the first result includes first information associated with a first state of the program code,
where the first state of the program code includes one or more first live updates of a variable on the one or more lines of the program code,
where the second result includes second information associated with a second state of the program code, and
where the second state of the program code includes one or more second live updates of the variable on the line of the program code.

* * * * *